(12) United States Patent
Yu et al.

(10) Patent No.: US 9,596,012 B2
(45) Date of Patent: Mar. 14, 2017

(54) PRECODING-RELATED SIGNAL TRANSMITTING OR RECEIVING METHOD AND APPARATUS

(71) Applicant: Samsung Electronics Co., Ltd., Suwon-si, Gyeonggi-do (KR)

(72) Inventors: Hyoungyoul Yu, Seoul (KR); Younsun Kim, Seongnam-si (KR); Hyojin Lee, Suwon-si (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/785,151

(22) PCT Filed: Apr. 16, 2014

(86) PCT No.: PCT/KR2014/003317
§ 371 (c)(1),
(2) Date: Oct. 16, 2015

(87) PCT Pub. No.: WO2014/171741
PCT Pub. Date: Oct. 23, 2014

(65) Prior Publication Data
US 2016/0072565 A1    Mar. 10, 2016

(30) Foreign Application Priority Data

Apr. 16, 2013 (KR) .................. 10-2013-0041907

(51) Int. Cl.
*H04B 7/04* (2006.01)
*H04L 1/00* (2006.01)
*H04B 7/06* (2006.01)

(52) U.S. Cl.
CPC ......... *H04B 7/0456* (2013.01); *H04B 7/0473* (2013.01); *H04B 7/063* (2013.01);
(Continued)

(58) Field of Classification Search
CPC ... H04B 1/38; H04B 7/02; H04B 7/04; H04B 7/0452; H04B 7/0456; H04B 7/06;
(Continued)

(56) References Cited

U.S. PATENT DOCUMENTS 9,184,818 B2 * 11/2015 Kim .................. H04B 7/024
2010/0002607 A1    1/2010 Kim et al.
(Continued)

FOREIGN PATENT DOCUMENTS

KR    10-2010-0005171 A    1/2010
KR    10-2010-0005649 A    1/2010
(Continued)

*Primary Examiner* — Shawkat M Ali
(74) *Attorney, Agent, or Firm* — Jefferson IP Law, LLP

(57) ABSTRACT

The present specification relates to a precoding-related information transmitting or receiving method and apparatus. A precoder-related information receiving method by a user equipment according to an embodiment of the present specification comprises the steps of: transmitting an aperiodic channel state information (CSI) report; receiving a rank indicator and a first precoder indicator from a base station; acquiring a second precoder indicator included in the most recent aperiodic CSI report which corresponds to the rank indicator in the aperiodic CSI reports transmitted by the user equipment; and receiving a signal using the first precoder indicator and the second precoder indicator. According to an embodiment of the present specification, precoding-related information can be effectively transmitted or received.

16 Claims, 18 Drawing Sheets

(52) U.S. Cl.
CPC ......... *H04B 7/0617* (2013.01); *H04B 7/0619* (2013.01); *H04B 7/0626* (2013.01); *H04L 1/0026* (2013.01); *H04L 1/0027* (2013.01)

(58) Field of Classification Search
CPC ......... H04B 7/0626; H04B 7/063; H04J 1/16; H04J 3/00; H04J 3/16; H04J 3/1694; H04L 1/00; H04L 1/06; H04L 5/00; H04L 5/0048; H04L 25/0224; H04W 4/00; H04W 24/04; H04W 24/10; H04W 72/04; H04W 88/02; H04W 88/08
USPC ............... 370/252, 280, 328, 329, 335, 336; 375/219, 260, 267, 349
See application file for complete search history.

(56) References Cited

U.S. PATENT DOCUMENTS

| | | | |
|---|---|---|---|
| 2010/0239036 A1* | 9/2010 | Koo | H04B 7/024 375/260 |
| 2011/0243079 A1* | 10/2011 | Chen | H04B 7/063 370/329 |
| 2012/0039369 A1 | 2/2012 | Choi et al. | |
| 2012/0063500 A1* | 3/2012 | Wang | H04L 1/0026 375/224 |
| 2012/0076028 A1* | 3/2012 | Ko | H04L 1/0026 370/252 |
| 2012/0201207 A1* | 8/2012 | Liu | H04W 24/10 370/329 |
| 2012/0213187 A1* | 8/2012 | Yang | H04L 1/0027 370/329 |
| 2012/0220286 A1 | 8/2012 | Chen et al. | |
| 2012/0287799 A1* | 11/2012 | Chen | H04B 7/024 370/252 |
| 2012/0320783 A1 | 12/2012 | Wu et al. | |
| 2013/0028225 A1* | 1/2013 | Ko | H04B 7/0486 370/329 |
| 2013/0070723 A1 | 3/2013 | Yie et al. | |
| 2013/0121312 A1* | 5/2013 | Roman | H04B 7/0486 370/335 |
| 2013/0336214 A1* | 12/2013 | Sayana | H04B 7/024 370/328 |
| 2014/0036796 A1* | 2/2014 | Etemad | H04W 24/04 370/329 |
| 2014/0112406 A1* | 4/2014 | Zhu | H04B 7/0452 375/267 |
| 2014/0269596 A1* | 9/2014 | Kim | H04B 7/0626 370/329 |
| 2015/0009922 A1* | 1/2015 | Hoshino | H04L 5/0053 370/329 |

FOREIGN PATENT DOCUMENTS

| | | |
|---|---|---|
| KR | 10-2010-0082894 A | 7/2010 |
| KR | 10-2011-0112054 A | 10/2011 |
| KR | 10-2012-0062597 A | 6/2012 |
| WO | 2011-152638 A2 | 12/2011 |
| WO | WO2012148478 * 11/2012 | ............... H04B 7/04 |

* cited by examiner

PRECODING-RELATED SIGNAL TRANSMITTING OR RECEIVING METHOD AND APPARATUS

TECHNICAL FIELD

The present description relates to a control signal transmission/reception method and apparatus, and more particularly, to a method and apparatus for transmitting or receiving a signal related to precoding.

BACKGROUND ART

A mobile communication system has been developed into a high-speed, high-quality radio packet data communication system so as to outgrow an initial voice-based service and now provide a data service and a multimedia service. Recently, for supporting a high-speed, high-quality radio packet data transmission service, various mobile communication standards such as HSDPA (High Speed Downlink Packet Access), HSUPA (High Speed Uplink Packet Access), LTE (Long Term Evolution), and LTE-A (LTE Advanced) of 3GPP (3rd Generation Partnership Project), HRPD (High Rate Packet Data) of 3GPP2, and 802.16 of IEEE (Institute of Electrical and Electronics Engineers) have been developed. Particularly, the LTE system is a system developed for effectively supporting high-speed radio packet data transmission and maximizes the capacity of radio system by utilizing various radio access techniques. The LTE-A system is an evolved radio system of the LTE system and has enhanced data transmission capability in comparison with LTE.

Normally, LTE refers to base station and UE (User Equipment) (or referred to as terminal) equipment corresponding to Release 8 or 9 of the 3GPP standard group, and LTE-A refers to base station and UE equipment corresponding to Release 10 of the 3GPP standard group. Even after the standardization of LTE-A system, the 3GPP standard group is performing the standardization regarding the subsequent release based on LTE-A and having improved performance.

The existing 3G and 4G radio packet data communication systems such as HSDPA, HSUPA, HRPD, LTE/LTE-A, or the like employ an adaptive modulation and coding (AMC) method and a channel sensitive scheduling method in order to improve transmission efficiency. Using the AMC method, a transmitter may regulate the quantity of transmission data according to a channel state. Namely, if a channel state is not good, the transmitter may reduce the amount of transmission data so as to adjust a reception error possibility to a desired level. Also, if a channel state is good, the transmitter may increase the amount of transmission data so as to adjust a reception error possibility to a desired level and also effectively transmit a lot of information. Using a resource management based on the channel sensitive scheduling method, a transmitter may offer a service to selected users having a better channel state among several users. This case increases a system capacity in comparison with other case of allocating a channel to a single user for a service. Such an increase in capacity is referred to as a multi-user diversity gain. Therefore, using the AMC method and the channel sensitive scheduling method, it is possible to receive feedback of partial channel state information (CSI) from a receiver and then apply suitable modulation and coding technique at the most efficient time point.

UE may offer feedback of CSI to a base station through a periodic CSI report or an aperiodic CSI report. The periodic CSI report means that UE periodically reports CSI to a base station. The CSI may include at least one of a rank indicator (RI), a precoding matrix indicator (PMI), and a channel quality indicator (CQI). The aperiodic CSI report means that UE reports CSI to a base station at the request of the base station. Namely, if a periodic CSI report is set, UE periodically transmits the periodic CSI report without additional instructions. On the other hand, in case of an aperiodic CSI report, UE transmits once the aperiodic CSI report in response to a request of a base station and then does not perform any additional report.

In case of being used together with a multiple input multiple output (MIMO) transmission scheme, the AMC method may also include a function to determine the number of or rank of spatial layers of a transmitting signal. In this case, the AMC method does not merely consider a coding rate and a modulation type so as to determine an optimal data rate, but also considers how many layers will be used for transmission using MIMO.

FIG. 1 is a diagram illustrating time and frequency resources in LTE/LTE-A system.

Referring to FIG. 1, radio resources transmitted to UE by a base station (or referred to as 'eNB') are divided in the unit of resource block (RB) on the frequency axis and also divided in the unit of subframe on the time axis. In the LTE/LTE-A system, RB is normally formed of twelve subcarriers and occupies a band of 180 kHz. Meanwhile, in the LTE/LTE-A system, subframe is normally formed of fourteen orthogonal frequency division multiplexing (OFDM) symbols and occupies a time span of 1 msec. During scheduling, the LTE/LTE-A system may allocate resources in the unit of subframe on the time axis and also allocate resources in the unit of RB on the frequency axis.

FIG. 2 is a diagram illustrating radio resources in LTE/LTE-A system.

Referring to FIG. 2, a radio resource 200 is formed of one subframe on the time axis and formed of one RB on the frequency axis. Such a radio resource 200 is formed of twelve subcarriers in the frequency domain and formed of fourteen OFDM symbols in the time domain, thus having total 168 positions of unique frequency and time. In LTE/LTE-A, each unique frequency and time position shown in FIG. 2 is referred to as a resource element (RE).

Different type signals as given below may be transmitted through a radio resource shown in FIG. 2.

CRS (Cell specific Reference Signal): CRS is a reference signal transmitted for all UEs which belong to a single cell. CRS is transmitted at every subframe and used for channel estimation between a base station and UE, monitoring about availability of a radio link, fine tuning of time or frequency at baseband, and the like.

DMRS (DeModulation Reference Signal): DMRS is a reference signal transmitted for specific UE.

PDSCH (Physical Downlink Shared CHannel): PDSCH is a data channel transmitted on downlink. PDSCH is used for a base station to transmit traffic to UE. PDSCH is transmitted using RE allocated for no transmission of a reference signal in a data region shown in FIG. 2.

CSI-RS (Channel State Information Reference Signal): CSI-RS is a reference signal transmitted for UEs which belong to a single cell, and used for channel state estimation. A plurality of CSI-RSs may be transmitted for a single cell.

Other control channels (PHICH, PCFICH, PDCCH): Other control channels are used for offering control information required for UE to receive PDSCH or used for ACK/NACK transmission for operating HARQ (Hybrid Automatic Repeat reQuest) with regard to data transmission on uplink.

In order to effectively obtain a spatial diversity gain or a spatial multiplexing gain, the MIMO system transmits PDSCH after precoding. The LTE/LTE-A system determines coding technique to be applied to each transmission mode (TM) and notifies the determined TM to UE. A method which allows UE to independently perform decoding of a received signal without information about precoding from a base station is referred to as open loop MIMO transmission. On the contrary, a method in which UE receives precoding information from a base station and uses this for decoding is referred to as closed loop (CL) MIMO transmission. As one method for performing CL MIMO transmission, the LTE/LTE-A system employs TM 4 and TM 6 for simultaneously transmitting precoded PDSCH and non-precoded CRS. CRS which is different in precoding from PDSCH is transmitted. Therefore, in order for a receiver of UE to obtain a channel estimation value on the basis of CRS and then perform restoration of PDSCH, UE should know a precoding relation between CRS and PDSCH. Namely, UE can perform a receiving operation including decoding of PDSCH only if UE receives, from a base station, a notification that indicates which precoding based on CRS is applied to PDSCH. In a decoding process, UE should know a precoding form of PDSCH using CRS, and a base station notifies precoding information to UE to perform decoding. Precoding may use a plurality of precoders. In this case, it is difficult for a base station to offer information about precoding to UE. Therefore, a base station and UE have the same codebook. A base station performs precoding by using a precoder specified in this codebook and then notifies an index (or an indicator) of the precoder to UE. Additionally, UE receives PDSCH by using a precoder of the notified index. The above-mentioned codebook refers to a precoding matrix or a set of precoders. In the present LTE/LTE-A system, MIMO transmission modes based on CRS are TM 6 and TM 4. In TM 6 that supports CL spatial multiplexing of a single layer, a transmitted precoding matrix indicator (TPMI) and a PMI confirmation bit are used for a method by which a base station notifies a precoder used in precoding to UE. Since TPMI records an index (or an indicator) of a precoder used by a base station in precoding, UE can know the precoder used in precoding through TPMI. Such TPMI is formed of 4-bit length and thus can indicate up to sixteen precoders. A PMI confirmation bit is a field by which a base station instructs UE to comply with a confirmation operation. In case a confirmation bit is set to 0, UE finds a precoder with reference to TPMI. In case a confirmation bit is set to 1, UE finds a precoder with reference to the latest aperiodic CSI report without referring to TPMI. For example, if a confirmation bit is set to 1, UE may receive a signal by using a precoding matrix indicated by PMI contained in the latest aperiodic CSI report.

In TM 4 that supports CL spatial multiplexing of a multi-layer, a base station records an index of a precoder in a precoding information field and then notifies it to UE. This precoding information field is formed of six bits and can indicate four layers. In a precoding information field, there is a region capable of indicating sixteen precoder indexes with regard to each layer. Besides, a precoding information field has a region of indicating "Precoding according to the latest PMI report on PUSCH" for each layer. The details of a precoding information field are shown in Table 1 below.

TABLE 1

| One codeword: Codeword 0 enabled, Codeword 1 disabled | | Two codewords: Codeword 0 enabled, Codeword 1 enabled | |
| --- | --- | --- | --- |
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . . . | . . . |
| . . . | | 15 | 2 layers: TPMI = 15 |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | . . . | . . . |
| . . . | . . . | 32 | 3 layers: TPMI = 15 |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |
| 35-63 | reserved | 35 | 4 layers: TPMI = 1 |
| | | . . . | |
| | | 49 | 4 layers: TPMI = 15 |

TABLE 1-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| | | 50 | 4 layers: Precoding according to the latest PMI report on PUSCH using the precoder(s) indicated by the reported PMI(s) |
| | | 51-63 | Reserved |

As mentioned above, using a conventional TPMI and a precoding information field, a base station can indicate $2^4$ (=16) precoder indexes to UE. Therefore, if a codebook having a $2^N$ (N>4) size is introduced so as to obtain a more improved beamforming gain than a conventional codebook, a current TPMI and a precoding information field give rise to a precoder incapable of being indicated to UE by a base station.

DISCLOSURE OF INVENTION

Technical Problem

Some embodiments of the present description have an object for providing a method and apparatus for effective transmission and reception of precoding-related information.

Problem to Solution

According an embodiment of this description, a method for receiving precoder-related information at user equipment (UE) may include steps of transmitting an aperiodic channel state information (CSI) report, receiving a rank indicator (RI) and a first precoder indicator from a base station, obtaining a second precoder indicator contained in the latest aperiodic CSI report corresponding to the RI from among the aperiodic CSI report transmitted by the UE, and receiving a signal by using the first precoder indicator and the second precoder indicator.

According another embodiment of this description, a method for receiving precoder-related information at user equipment (UE) may include steps of receiving a rank indicator (RI) and a first precoder indicator from a base station, obtaining a second precoder indicator by using the RI from at least one aperiodic channel state information (CSI) report or periodic CSI report transmitted by the UE, and receiving a signal by using the received first precoder indicator and the obtained second precoder indicator. Here, the first precoder indicator may be associated with one of a W1 precoder index and a W2 precoder index having a double codebook structure, and the second precoder indicator may be associated with the other.

The step of obtaining the second precoder indicator may include obtaining the second precoder indicator contained in the latest aperiodic CSI report corresponding to the RI from among the at least one aperiodic CSI report.

The step of obtaining the second precoder indicator may include obtaining the second precoder indicator contained in the latest aperiodic CSI report from among aperiodic CSI reports corresponding to the RI of the at least one aperiodic CSI report or the RI set to use the same precoder as the RI.

The aperiodic CSI report may contain the second precoder indicator for each of a plurality of RIs, or the periodic CSI report may contain the second precoder indicator for each of a plurality of RIs.

The step of obtaining the second precoder indicator may include obtaining the second precoder indicator for the RI from among the second precoder indicators contained in the latest aperiodic CSI report from among the at least one aperiodic CSI report.

The aperiodic CSI report may contain the second precoder indicator for each of a plurality of RI groups having at least one RI, and the same precoder may be set to be used for RIs contained in the RI group.

The step of obtaining the second precoder indicator may include obtaining the second precoder indicator for the RI group containing the RI from among the second precoder indicators contained in the latest CSI report from among the at least one aperiodic CSI report.

The step of receiving the RI and the first precoder indicator may include receiving confirmation information indicating a codebook to be used between first and second codebooks, and the second codebook may be greater in size than the first codebook. The second precoder indicator may be obtained in case the confirmation information indicates use of the second codebook.

According another embodiment of this description, user equipment (UE) for receiving precoder-related information may include a receiver configured to receive a rank indicator (RI) and a first precoder indicator from a base station, and a controller configured to obtain a second precoder indicator by using the RI from at least one aperiodic channel state information (CSI) report or periodic CSI report transmitted by the UE, and to control reception of a signal by using the received first precoder indicator and the obtained second precoder indicator.

The controller may be further configured to obtain the second precoder indicator contained in the latest aperiodic CSI report corresponding to the RI from among the at least one aperiodic CSI report.

The controller may be further configured to obtain the second precoder indicator contained in the latest aperiodic CSI report from among aperiodic CSI reports corresponding to the RI of the at least one aperiodic CSI report or the RI set to use the same precoder as the RI.

The aperiodic CSI report may contain the second precoder indicator for each of a plurality of RIs, or the periodic CSI report may contain the second precoder indicator for each of a plurality of RIs.

The controller may be further configured to obtain the second precoder indicator for the RI from among the second precoder indicators contained in the latest aperiodic CSI report from among the at least one aperiodic CSI report.

The aperiodic CSI report may contain the second precoder indicator for each of a plurality of RI groups having at least one RI, and the same precoder may be set to be used for RIs contained in the RI group.

The controller may be further configured to obtain the second precoder indicator for the RI group containing the RI from among the second precoder indicators contained in the latest CSI report from among the at least one aperiodic CSI report.

The receiver may be further configured to receive confirmation information indicating a codebook to be used between first and second codebooks, and the second codebook may be greater in size than the first codebook. The controller may be further configured to obtain the second precoder indicator in case the confirmation information indicates use of the second codebook.

According still another embodiment of this description, a method for transmitting precoder-related information at a base station may include steps of receiving an aperiodic channel state information (CSI) report from user equipment (UE), transmitting a rank indicator (RI) and a first precoder indicator to the UE, obtaining a second precoder indicator by using the RI from at least one aperiodic CSI report or periodic CSI report transmitted by the UE, and transmitting a signal to the UE by using the first precoder indicator and the obtained second precoder indicator.

According yet another embodiment of this description, a base station for transmitting precoder-related information may include a receiver configured to receive an aperiodic channel state information (CSI) report from user equipment (UE), a transmitter configured to transmit a rank indicator (RI) and a first precoder indicator to the UE, and a controller configured to obtain a second precoder indicator by using the RI from at least one aperiodic CSI report or periodic CSI report transmitted by the UE, and to control transmission of a signal to the UE by using the first precoder indicator and the obtained second precoder indicator.

Advantageous Effects of Invention

According to an embodiment of the present description, precoding-related information may be transmitted and received effectively.

MODE FOR THE INVENTION

Figure 1:
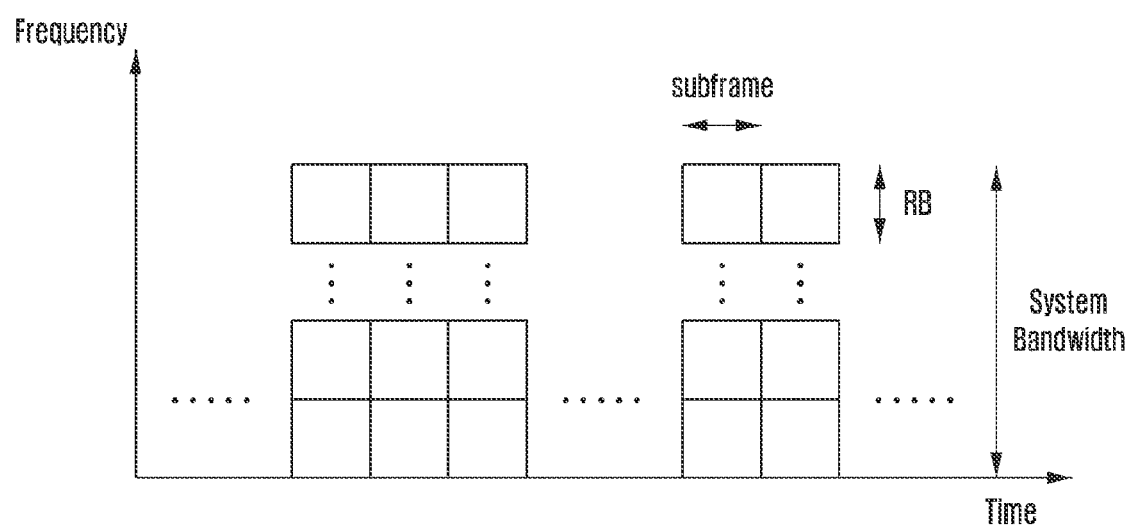
FIG. 1 is a diagram illustrating time and frequency resources in LTE/LTE-A system.
Figure 2:
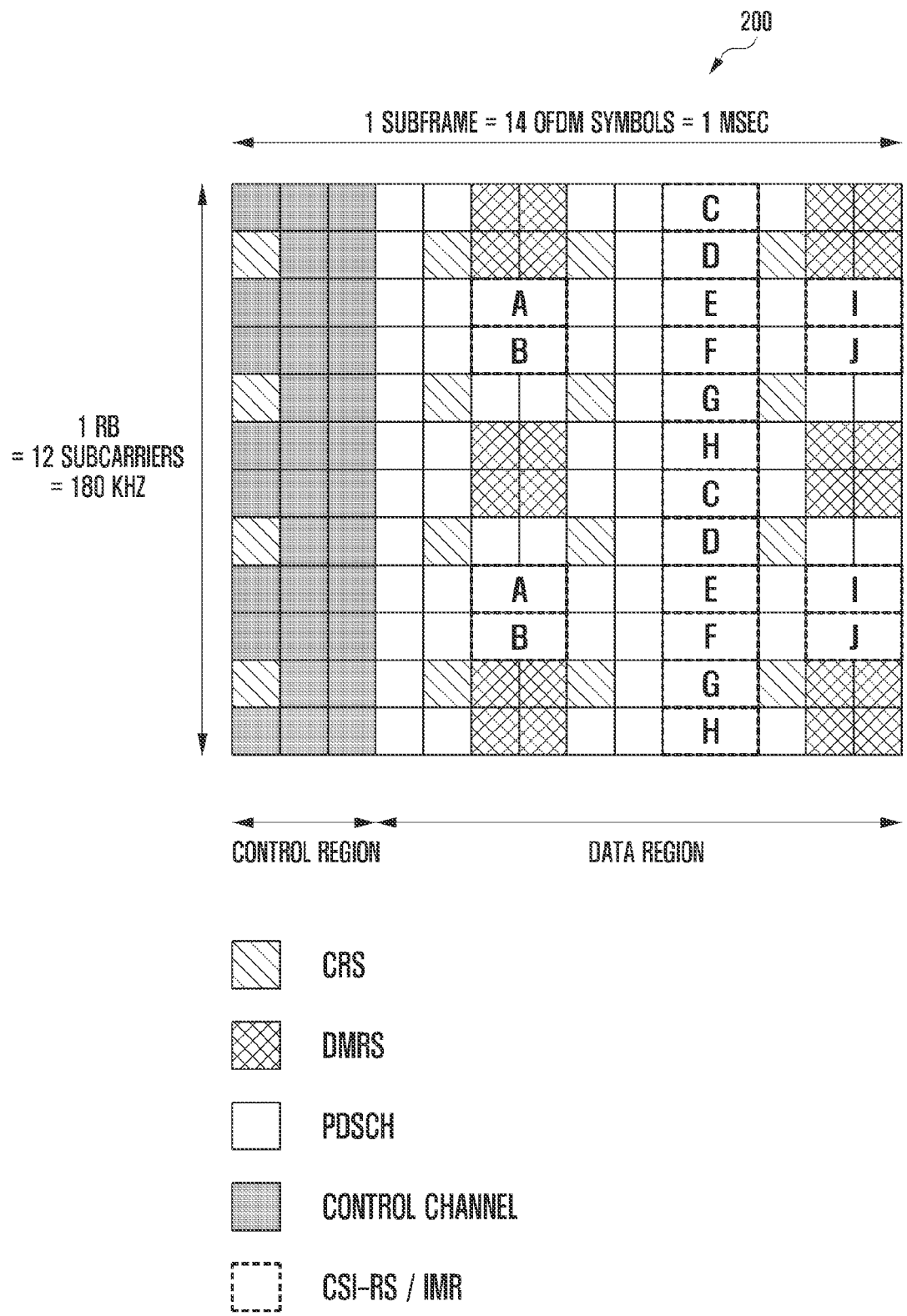
FIG. 2 is a diagram illustrating radio resources in LTE/LTE-A system.

Hereinafter, embodiments of the present description will be described with reference to the accompanying drawings. In this disclosure, well known techniques or elements may not be described or illustrated in detail to avoid obscuring the subject matter of the present invention. Additionally, the terms used herein are only used to describe specific various embodiments, and are not intended to limit this invention. The present invention may be embodied in many different forms and should not be construed as limited to the embodiments set forth herein.

Although specific embodiments will be described hereinafter by mainly targeting OFDM-based radio communication systems, especially 3GPP E-UTRAN (Evolved UMTS Terrestrial Radio Access) standards, the essential concept of this invention may be favorably applied to any other communication system having a similar technical background and channel form without departing from the scope of this invention as will be understood by those skilled in the art.

In the present LTE and/or LTE-A system, there are TM 6 and TM 4 as MIMO transmission modes based on CRS. In TM 6 that supports CL spatial multiplexing of a single layer, a transmitted precoding matrix indicator (TPMI) and a PMI confirmation bit are used for a method by which a base station notifies a precoder used in precoding to UE. Since TPMI records an index of a precoder used by a base station in precoding, UE can know the precoder used in precoding through TPMI. Such TPMI is formed of 4-bit length and thus can indicate up to sixteen precoders. A PMI confirmation bit is a bit by which a base station instructs UE to comply with a confirmation operation. In case a confirmation bit is set to 0, UE finds a precoder with reference to TPMI. In case a confirmation bit is set to 1, UE finds a precoder with reference to the latest aperiodic CSI report.

In TM 4 that supports CL spatial multiplexing of a multi-layer, a base station records an index of a precoder in a precoding information field and then notifies it to UE. This precoding information field is formed of six bits and can indicate four layers. A precoding information field has a region capable of indicating sixteen precoder indexes with regard to each layer. In addition, a precoding information field has a region of indicating "Precoding according to the latest PMI report on PUSCH" for each layer.

As mentioned above, using a conventional TPMI and a precoding information field, a base station can indicate one precoder index selected from $2^4$ candidates to UE. Therefore, if a codebook having a $2^N$ (N>4) size is introduced so as to obtain a more improved beamforming gain than a conventional codebook, a current TPMI and a precoding information field give rise to a precoder that can be hardly indicated to UE by a base station.

Proposed in the present description is a method in which a base station notifies a codebook index to UE when a size-increased codebook is introduced in such a situation.

Although the present description discloses embodiments having similar structures to those of conventional technique so as to emphasize advantages such as the easiness of utilizing and embodying conventional technique, a reduction in development cost, and the like, any other variation or modification that meets the subject matter of this invention may belong to the appended claims.

According to the first embodiment of this description, like the operation of TM 4 or TM 6 in the existing LTE, a base station notifies a precoder used for transmission of PDSCH to UE through downlink control information containing a precoder indicator.

However, according to the first embodiment, by using a precoder indicator having much more information than TPMI used for TM 6 or a precoding information field used for TM 4 in LTE, a base station may instruct UE about more precoders than ever before. Namely, the base station may extend a precoding information field by using more bits and notify it to the UE. Then the UE receives downlink control information, identifies a precoder used for PDSCH transmission, and uses, in PDSCH reception, a precoder indicated by a precoder indicator having much more information.

As an example of a precoder indicator well known, there are a PMI confirmation bit and TPMI having a 4-bit size supporting single layer transmission in TM 6. A PMI confirmation bit is a bit by which a base station instructs UE to comply with a precoding matrix index (PMI) contained in a recent aperiodic CSI report. Also, there is a precoding information field having 6-bit size supporting multi-layer transmission in conventional TM 4. Besides, all information regions for notifying precoder information to UE are included in the concept of a precoding indicator.

Figure 3:
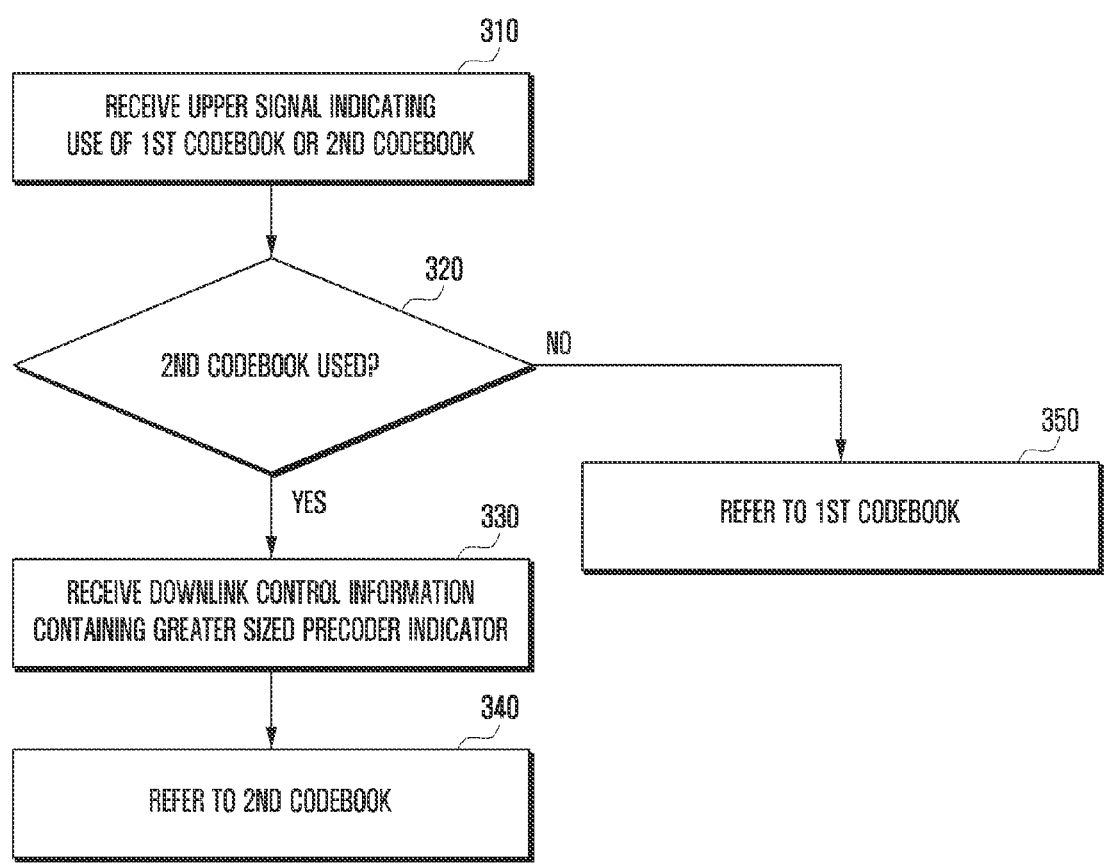
FIG. 3 is a flow diagram illustrating a process of receiving precoding-related information at UE according to the first embodiment of this description.

FIG. 3 is a flow diagram illustrating a process of receiving precoding-related information at UE according to the first embodiment of this description.

Referring to FIG. 3, at step 310, UE receives an upper signal that indicates whether to use the first codebook or the second codebook. The upper signal is transmitted by a base station and may include, for example, a radio resource control (RRC) signal. Here, the first codebook may correspond to a smaller sized codebook (16 or less) used in the existing LTE, and the second codebook may correspond to a greater sized codebook (17 or more) than that of newly designed LTE. Here, the size of a codebook is the number of precoder candidates (precoding matrix) contained in the codebook. If there is no upper signal for indicating whether to use the first codebook or the second codebook, the UE recognizes that the first codebook is used. Thereafter, at step 320, the UE checks the content of the upper signal and thereby determines whether it is set to use a new codebook (the second codebook). If it is set to use the second codebook, at step 330, the UE receives downlink control information containing a great sized precoder indicator (e.g., 5 bits or more). If the UE uses a great sized codebook having $2^N$ (N>4) precoders and operates in a transmission mode supporting all of ranks 1, 2, 3 and 4, the UE receives downlink control information containing a precoder indicator having a greater size than that of a precoder indicator contained in conventional DCI (Downlink Control Information) format 2. Table 2 shows an example of a precoder indicator required for case in which the UE uses a great sized codebook having $2^N$ (N>4) precoders and operates in a transmission mode sunnorting all of ranks 1. 2. 3 and 4.

TABLE 2

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | ... | ... |
| ... | | $2^N_- - 1$ | 2 layers: TPMI = $2^N_-$ - 1 |
| $2^N_-$ | 1 layer: TPMI = $2^N_-$ − 1 | $2^N_-$ | 2 layers: Precoding according to the latest PMI report on PUSCH using the precoder(s) indicated by the reported PMI(s) |
| $2^N_-$ + 1 | 1 layer: Precoding according to the latest PMI report on PUSCH using the precoder(s) indicated by the reported PMI(s) | $2^N_-$ + 1 | 3 layers: TPMI = 0 |
| $2^N_-$ + 2 | 2 layers: TPMI = 0 | $2^N_-$ + 2 | 3 layers: TPMI = 1 |
| $2^N_-$ + 3 | 2 layers: TPMI = 1 | ... | ... |

TABLE 2-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| ... | ... | $2^{N+1}$ | 3 layers: TPMI = $2^{N}$ - 1 |
| $2^{N+1}$ + 1 | 2 layers: TPMI = $2^{N}$ - 1 | $2^{N+1}$ + 1 | 3 layers: Precoding according to the latest PMI report on PUSCH using the precoder(s) indicated by the reported PMI(s) |
| $2^{N+1}$ + 2 | 2 layers: Precoding according to the latest PMI report on PUSCH using the precoder(s) indicated by the reported PMI(s) | $2^{N+1}$ + 2 | 4 layers: TPMI = 0 |
| $2^{N+1}$ + 3 – $2^{N+2}$ – 1 | reserved | $2^{N+1}$ + 3 | 4 layers: TPMI = 1 |
| | | ... | |
| | | $2^{N+1}$ + $2^{N}$ + 1 | 4 layers: TPMI = $2^{N}$ - 1 |
| | | $2^{N+1}$ + $2^{N}$ + 2 | 4 layers: Precoding according to the latest PMI report on PUSCH using the precoder(s) indicated by the reported PMI(s) |
| | | $2^{N+1}$ + $2^{N}$ + 3 – $2^{N+2}$ – 1 | Reserved |

According to another case, if the UE uses a great sized codebook having $2^N$ precoders and operates in a transmission mode supporting only rank 1, the UE receives downlink control information containing a precoder indicator having a greater size than that of a precoder indicator (e.g., TPMI) of conventional DCI format 1B. Table 3 shows an example of a precoder indicator required for case in which the UE uses a great sized codebook having $2^N$ precoders and operates in a transmission mode supporting only rank 1.

TABLE 3

| Number of antenna ports at eNodeB | Number of precoding information field bits |
|---|---|
| 2 | 2 |
| 4 | N (codebook size = $2^N$) |

At step 340, the UE identifies a great sized precoder indicator in the received downlink control information in the manner of Table 2 or Table 3 or in any other similar manner, and uses, for PDSCH reception, a corresponding precoder in the second codebook by referring to the identified precoder indicator.

If it is checked at step 320 that the second codebook is not used, step 350 is performed. If the UE uses a great sized codebook having $2^N$ precoders and operates in a transmission mode supporting all of ranks 1, 2, 3 and 4, at step 350, the UE analyzes precoding information in the manner of conventional DCI format 2, identifies a precoding matrix by referring to the existing codebook, and then uses it for PDSCH reception.

Figure 4:
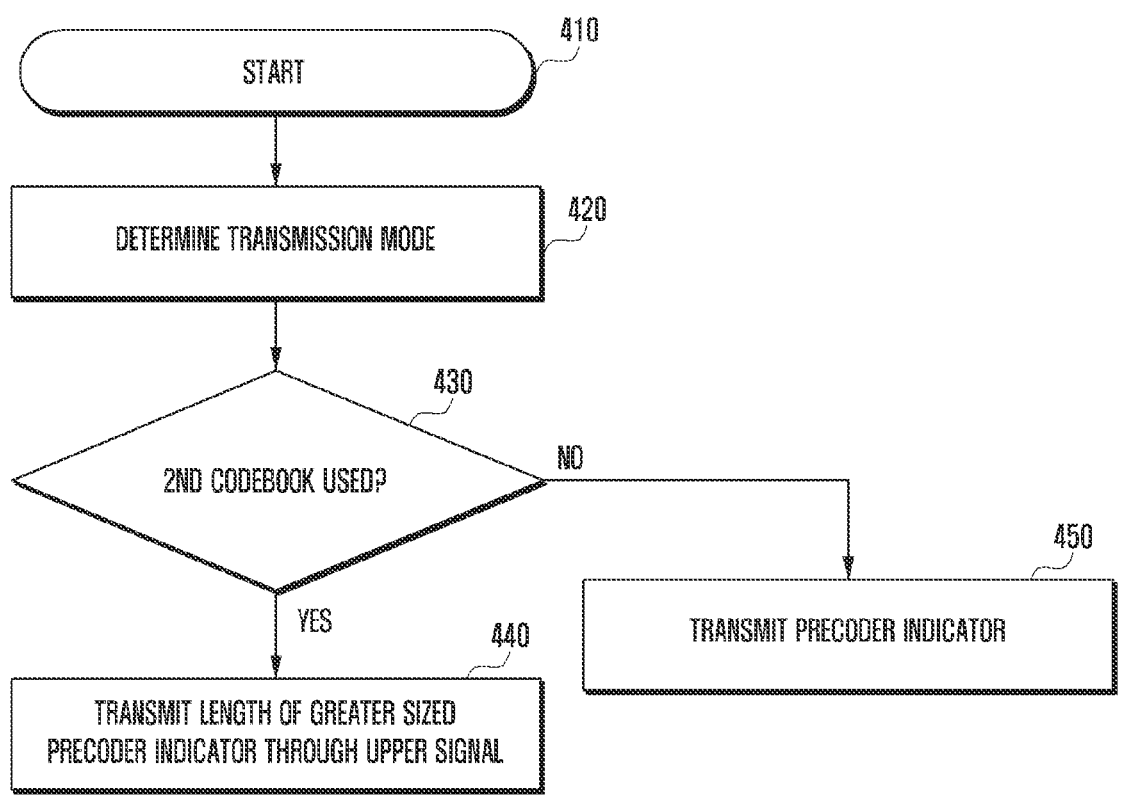
FIG. 4 is a flow diagram illustrating a process of transmitting precoding-related information at a base station according to the first embodiment of this description.

FIG. 4 is a flow diagram illustrating a process of transmitting precoding-related information at a base station according to the first embodiment of this description.

Referring to FIG. 4, at step 410, the process of transmitting precoding-related information is started. At step 420, the base station determines whether to operate in a transmission mode supporting all of ranks 1, 2, 3 and 4 or operate in a transmission mode supporting only rank 1. At step 430, the base station determines whether to use the second codebook having a greater size than that of a newly designed LTE. If the UE is in an environment capable of supporting and using the second codebook, the base station may set the UE to use the second codebook. In case of determining the UE to use the second codebook, the process performs step 440. In the other case, the process performs step 450. In case of using the second codebook and in a transmission mode supporting all of ranks 1, 2, 3 and 4, the base station inserts, into downlink control information, a greater sized precoder indicator than a precoding indicator contained in conventional DCI format 2. In case of using the second codebook and in a transmission mode supporting only rank 1, the base station inserts, into downlink control information, a greater sized precoder indicator than a precoding indicator contained in conventional DCI format 1B. At step 440, the base station notifies, by using an upper signal, the length of a greater sized precoder indicator for use of the second codebook to the UE. The base station may notify the length itself of a precoder indicator to the UE or transmit, to the UE, an indicator for indicating that a precoder indicator has a relatively higher length between two lengths. At step 450, the base station determines the use of the first codebook and transmits a precoder indicator having a size corresponding to the size of the first codebook. At step 450, the base station transmits a precoder indicator complying with a conventional manner to the UE.

The UE receives a signal by applying a precoder according to the obtained precoder indicator.

Figure 5:
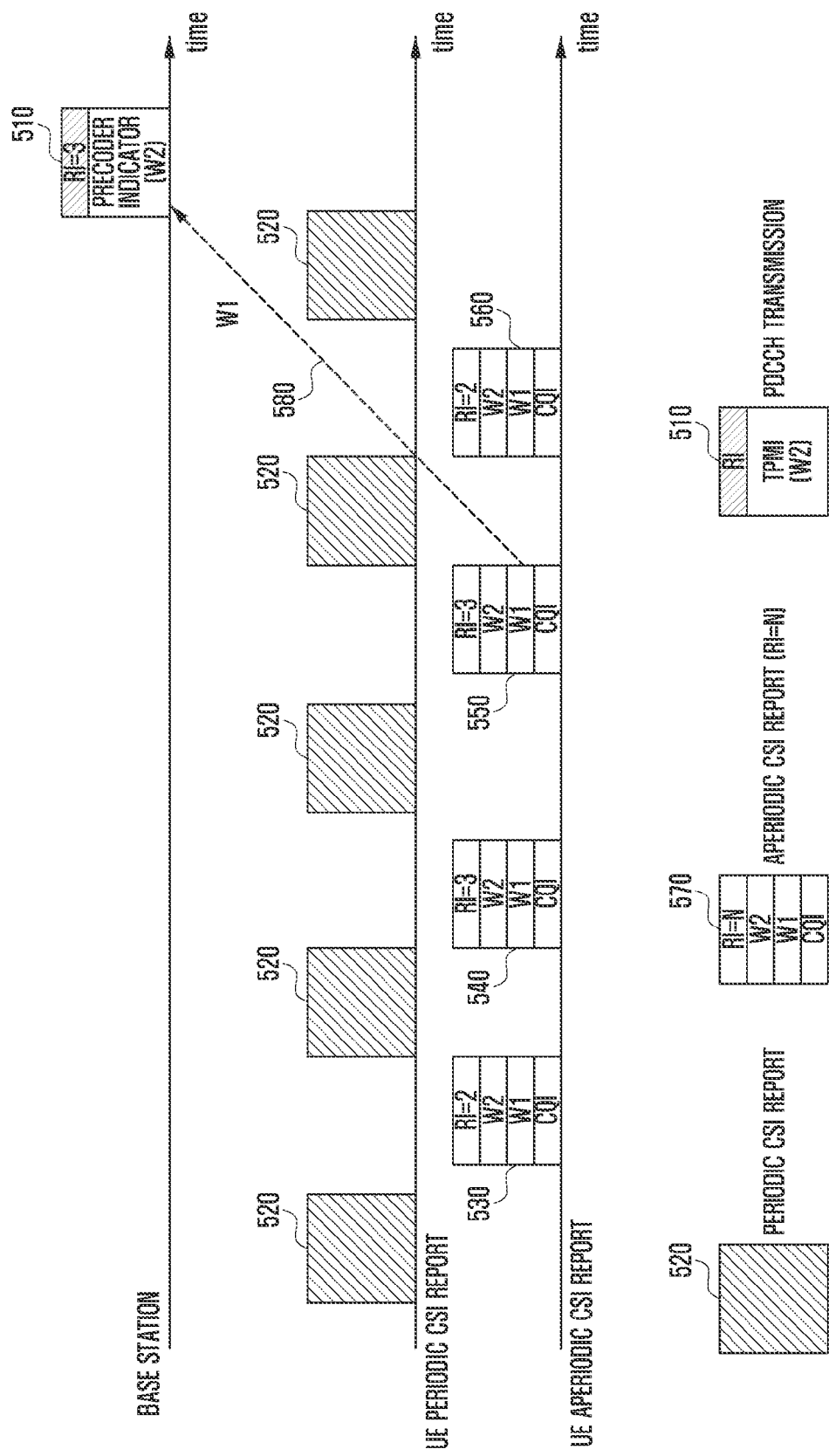
FIG. 5 illustrates a transmission/reception procedure of precoder-related information according to the second embodiment of this description.

FIG. 5 illustrates a transmission/reception procedure of precoder-related information according to the second embodiment of this description. According to the second embodiment, by using a double codebook structure employing two precoding-related indicators W1 and W2, UE identifies a precoder matrix used for PDSCH transmission by a base station.

Contrary to the first embodiment that uses a precoder indicator having relatively much more information, the second embodiment of this description uses a precoder indicator having the same bits as a conventional precoder indicator has. Nevertheless, the base station has an advantage of being able to notifying a precoding indicator regarding a greater sized codebook.

A double codebook structure employing W1 and W2 is a structure of creating a new precoder by combining precoders W1 and W2. The created precoder reflects both features of W1 and features of W2. In LTE/LTE-A systems, such a double codebook structure is used for 8 Tx MIMO transmission. W1 is a precoder that reflects a long term channel property, and a value of W1 is varied slowly according to time. W2 is a precoder that reflects a short term channel property, and a value of W2 is varied frequently and quickly according to time. The precoder created as a combination of W1 and W2 has features based on W1 and having short term channel variations of W2.

Contrary to the first embodiment, the second embodiment of this description has features capable of supporting a size-increased codebook without a variation in the amount of information of a precoder indicator. Specifically, the UE receives a precoder index of W2 through a precoder indicator transmitted by the base station, and complies with a precoder index contained in the latest aperiodic CSI report since a precoder index of W1 is varied slowly according to time. Through this, the base station may instruct the UE about precoder indexes of W1 and W2 without a change in the length of a precoder indicator.

In the second embodiment and some embodiments to be discussed below, a W1 precoder index contained in an aperiodic CSI report is utilized for determining a W1 precoder, and a precoder index contained in a periodic CSI report is not utilized. The reason that this method is used is that a periodic CSI report often contains only part of RI, PMI and CQI due to a limitation of length and thereby a process of finding a suitable W1 precoder index by the UE and/or the base station becomes complicated. However, if this complexity can be solved, a precoder index contained in a periodic CSI report may be utilized for finding a W1 precoder indicator.

Referring to FIG. 5, step 520 indicates that the UE periodically reports CSI to the base station. Channel state information (CSI) contains at least part of RI, PMI and CQI and is reported through PUCCH. Steps 530, 540, 550 and 560 indicate that the UE aperiodically reports CSI. This aperiodic CSI report is performed by the UE at the request of the base station. In CSI delivered at steps 530, 540, 550 and 560, RI may be varied at each report. Step 510 indicates that the base station notifies a precoder index used in W2 and rank to the UE through PDCCH by using a precoder indicator. By referring to a periodic or aperiodic CSI report of the UE, the base station determines W2 to be used for precoding and rank. At this time, in the use of a precoder of W1, the base station refers to an aperiodic CSI report that contains the same rank as rank (RI=3) determined at step 510. Additionally, from among steps 540 and 550 where RI=3 is reported, a precoder indicated by W1 index of the latest report 550 is used.

According to the second embodiment of this description, by using two kinds of information, the UE determines which precoding is applied by the base station. The first information is a precoder indicator (or index) of W2 transmitted to the UE by the base station. The second information is a precoder index of W1 contained in the latest aperiodic CSI report transmitted to the base station by the UE. The W1 corresponds to W1 of an aperiodic CSI report having an RI value equal to rank notified (step 510) through PDCCH in the latest aperiodic CSI report transmitted to the base station by the UE. Namely, the UE assumes that W1 of the latest aperiodic CSI having RI of the same value as rank notified using PDCCH by the base station is applied. In case this approach is applied, the base station may notify information only corresponding to W1 through PDCCH and thus can perform efficient MIMO transmission/reception while minimizing downlink overhead.

Figure 6:
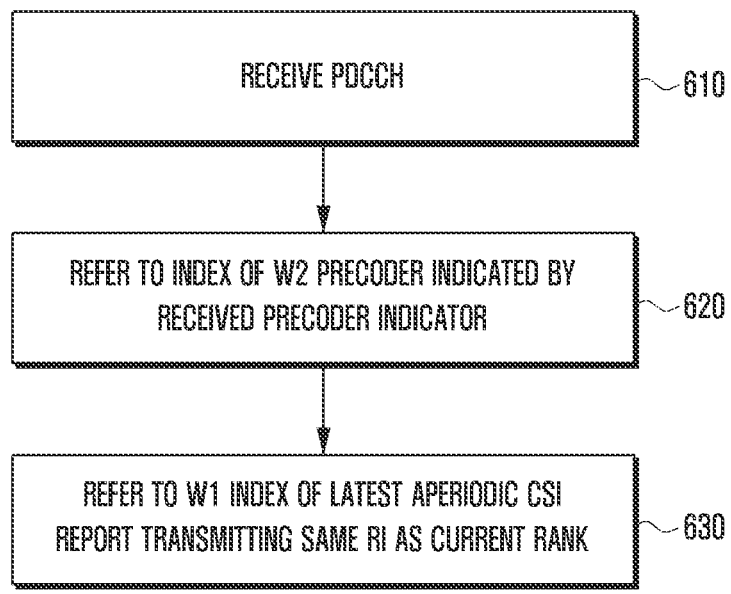
FIG. 6 is a flow diagram illustrating a process of receiving precoding-related information at UE according to the second embodiment of this description.

FIG. 6 is a flow diagram illustrating a process of receiving precoding-related information at UE according to the second embodiment of this description.

Referring to FIG. 6, at step 610, the UE receives PDCCH and finds a precoder indicator contained therein. At step 620, the UE identifies an index of W2 precoder contained in the precoder indicator and uses, as a W2 precoder, a precoder indicated by this index. At step 630, the UE finds a W1 precoder. Namely, the UE identifies rank which is set by the base station, and refers to aperiodic CSI reports that contain the same RI as the set rank. Then the UE uses, as a W1 precoder, an index of W1 contained in the latest report from among such aperiodic reports.

According to the second embodiment, a similar manner may be used for a CSI report having a double codebook structure using W1 and W2. In addition to a double codebook structure, this invention may be also applied to any other codebook structure in which two or more precoder indexes are used.

The UE receives a signal by applying a precoder according to the obtained precoder indicator.

Figure 7:
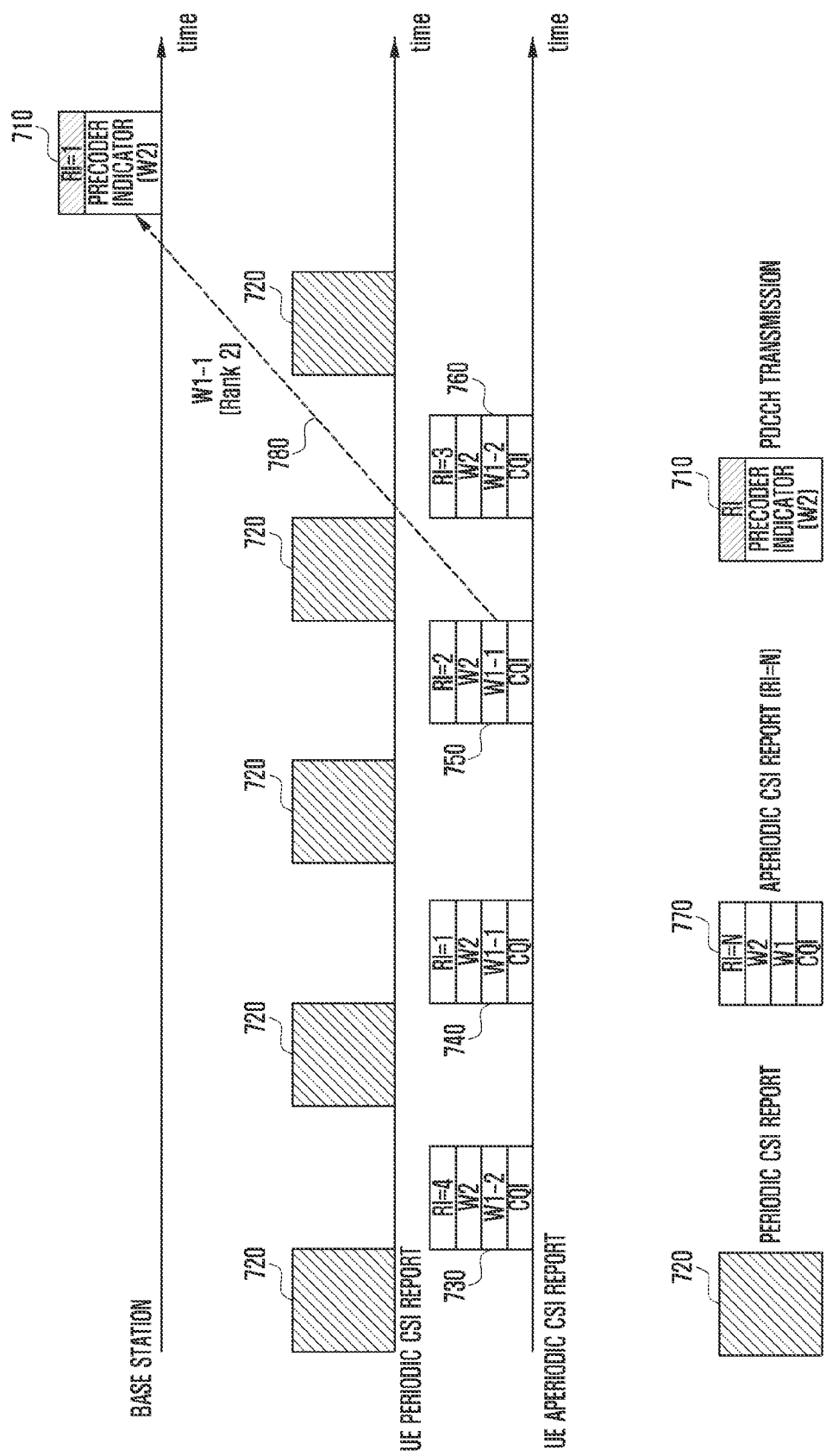
FIG. 7 illustrates a transmission/reception procedure of precoding-related information according to the third embodiment of this description.

FIG. 7 illustrates a transmission/reception procedure of precoding-related information according to the third embodiment of this description. The third embodiment is a method of allowing the UE to find a precoder used in precoding of PDSCH when the same W1 precoder is set to be used for several ranks.

The third embodiment is an example of allowing the UE to find a precoder required for PDSCH reception in case the same W1 precoder is set to be used for several ranks in a W1 and W2 double codebook structure. Since several ranks use the same W1 precoder, the UE may refer to and use the latest aperiodic CSI report if the same W1 precoder is used even though RI contained in the latest aperiodic CSI report is different from being set (or scheduled). Therefore, according to the third embodiment, a W1 precoder that reflects a more recent channel state than that in the second embodiment may be used advantageously.

Although the third embodiment relates to a W1 and W2 double codebook structure, it may be also applied to case having any other codebook structure in which two or more precoder indexes are used.

Referring to FIG. 7, for the description of this embodiment, it is supposed that a W1 precoder used for rank 1 or 2 is denoted by W1-1 and also a W2 precoder used for rank 3 or 4 is denoted by W1-2. Step 720 indicates that the UE periodically reports CSI to the base station. Channel state information (CSI) contains at least part of RI, PMI and CQI and is reported through PUCCH. Steps 730, 740, 750 and 760 indicate that the UE aperiodically reports CSI. This aperiodic CSI report is performed by the UE at the request of the base station. RI contained in such aperiodic CSI reports at steps 730, 740, 750 and 760 may be varied at each report. Step 710 indicates that the base station notifies a precoder index used in W2 and rank to the UE through PDCCH by using a precoder indicator. By referring to a periodic or aperiodic CSI report of the UE, the base station determines W2 to be used for precoding and rank. At this time, according to the second embodiment, the base station should refer to an aperiodic CSI report 740 having R1=1 equal to rank (RI=1) determined at step 710. By the way, since an aperiodic CSI report at step 750 has RI 2 and it is set to use the same W1-1 with regard to RI 1 and 2, the base station performs precoding of PDSCH by using W1-1 of the latest report at step 750. W1-1 transmitted at steps 740 and 750 may be different precoder indexes. The reason is that a difference may be caused in a channel state due to a difference in time between steps 740 and 750. However, since the same S1 precoder is applied to rank 1 and rank 2, W1-1 transmitted at step 750 may be applied to rank 1. Therefore, the UE and the base station apply W1-1 transmitted at step 750 to rank 1.

Figure 8:
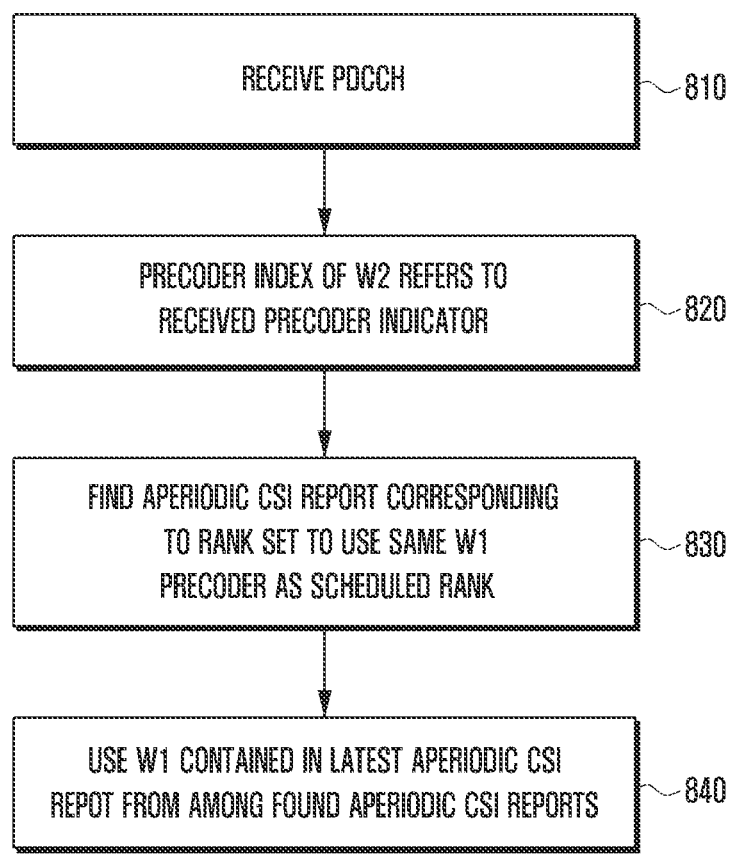
FIG. 8 is a flow diagram illustrating a process of receiving precoding-related information at UE according to the third embodiment of this description.

FIG. 8 is a flow diagram illustrating a process of receiving precoding-related information at UE according to the third embodiment of this description.

Referring to FIG. 8, at step 810, the UE receives downlink control information through PDCCH. The UE receives a precoder indicator and other information required for PDSCH reception through PDCCH. At step 820, the UE identifies an index of a W2 precoder indicated by the received precoder indicator. Here, the size of a codebook of W2 should be equal to or less than a size capable of being indicated by a precoder indicator. For example, in the current LTE system, the base station may indicate one precoder of 16 candidates to the UE by using TPMI having a 4-bit length. Therefore, if a precoder indicator is formed of N bits, a precoder of a W2 codebook should be $2^N$ or less. At step 830, the UE finds a recent aperiodic CSI report containing RI which is set to use the same W1 precoder as that of rank which is set (or scheduled) by the base station. For example, RI 1 and RI 2 may use the same W1 precoder, and RI 3 and RI 4 may use the same W1 precoder. Referring to FIG. 7, since the base station schedules rank 1 to the UE through control information at step 710, the UE finds aperiodic CSI reports containing RI=1 or RI=2. Aperiodic CSI reports corresponding to this include an aperiodic CSI report of step 740 and an aperiodic CSI report of step 750.

At step 840, the UE receives PDSCH by referring to an index of W1 contained in the latest aperiodic CSI report from among aperiodic CSI reports having RI=1 or RI=2. Referring to FIG. 7, since the UE reports RI=1 at step 740 and also reports RI=2 at step 750, the UE receives PDSCH by using W1-1 contained in the latest aperiodic CSI report of step 750.

According to a modification of the third embodiment, when a W1 precoder is an identity matrix at several ranks or a certain rank, the base station and the UE may not use W1. For example, if rank 3 or rank 4 is set (or scheduled) to the UE by the base station when the W1 precoder of ranks 3 and 4 is an identity matrix, the UE may use an identity matrix without referring to W1 of the latest aperiodic CSI report.

The UE receives a signal by applying a precoder according to the obtained precoder indicator.

Figure 9:
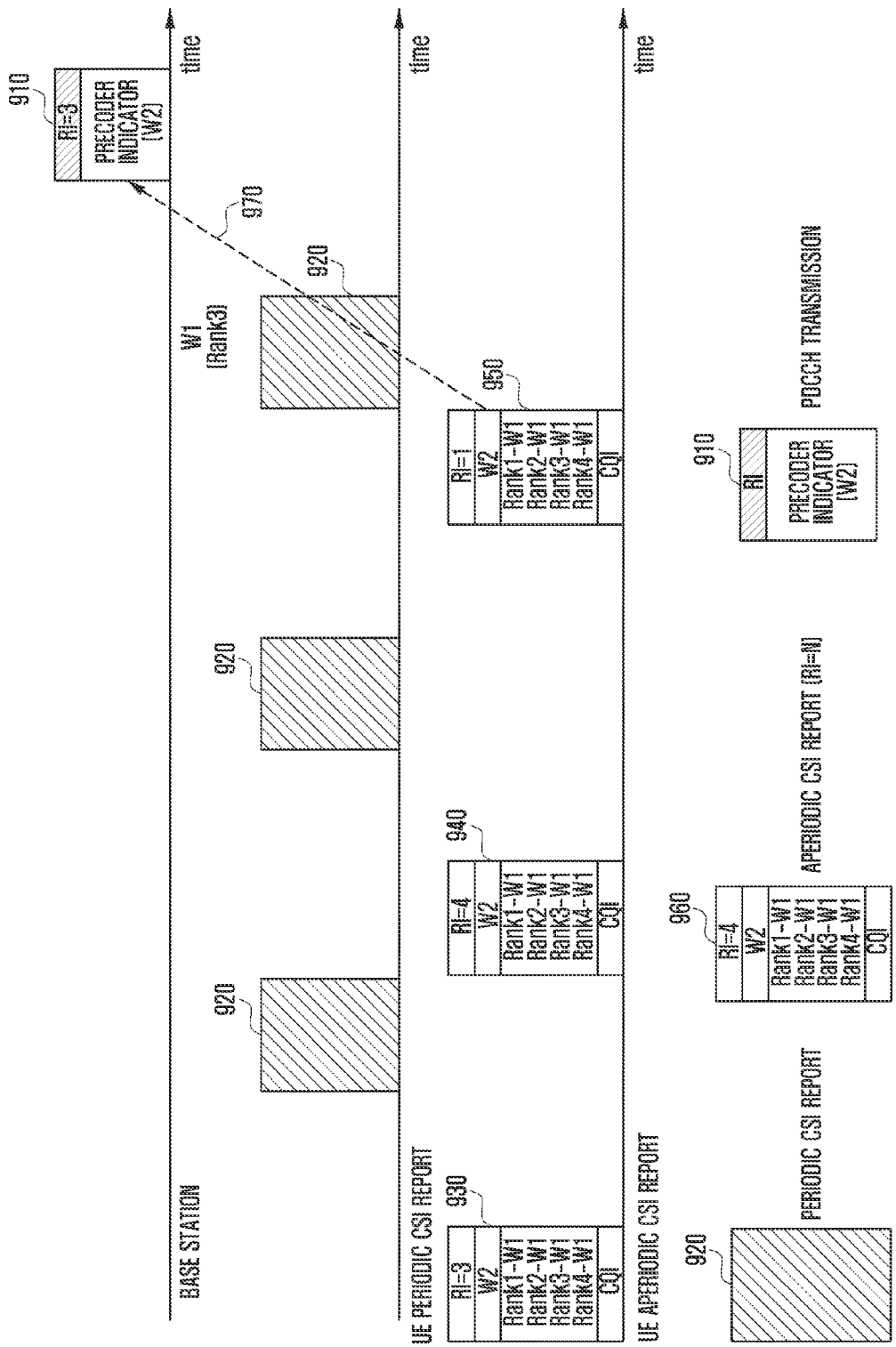
FIG. 9 illustrates a transmission/reception procedure of precoding-related information according to the fourth embodiment of this description.

FIG. 9 illustrates a transmission/reception procedure of precoding-related information according to the fourth embodiment of this description.

According to the fourth embodiment of this description, an aperiodic CSI report contains precoder indexes regarding all rank cases.

According to the fourth embodiment of this description, in a double codebook structure having W1 and W2, the UE transmits a W1 precoder in rank 1, a W1 precoder in rank 2, a W1 precoder in rank 3, and a W1 precoder in rank 4 (precoders of much more ranks may be included) through every aperiodic CSI report. Therefore, the UE can find a W1 precoder used for actual PDSCH transmission by referring to the latest aperiodic CSI report. Specifically, in order for the UE to find a W1 precoder by referring to an aperiodic CSI report, a precoder used for rank scheduled to the UE should be equal to a precoder indicated by PMI of a CSI report. If a channel is changed with the lapse of time, a precoder to which the UE refers is not valid any more. An advantage of the fourth embodiment is that the UE can refer to a W1 precoder index of the latest aperiodic CSI report regardless of rank scheduled by the base station since all aperiodic CSI reports contains a W1 precoder in rank 1, a W1 precoder in rank 2, a W1 precoder in rank 3, and a W1 precoder in rank 4.

Referring to FIG. 9, at step 920, the UE transmits a periodic CSI report to the base station through PUCCH. Additionally, at steps 930, 940 and 950, the UE determines RI of rank preferred currently by the UE and also determines a W1 precoder index in rank 1, a W1 precoder index in rank 2, a W1 precoder index in rank 3, a W1 precoder index in rank 4, and an index of a W2 precoder. Additionally, the UE determines CQI by using a W1 precoder and a W2 precoder in rank indicated by the determined RI. Then the UE transmits the determined RI, a W2 precoder index, W1 precoder indexes in all ranks, and CQI to the base station through an aperiodic CSI report. Namely, an aperiodic CSI report contains RI, a W2 precoder index, CQI, and a W1 precoder indexes for each rank. At step 910, the base station determines rank by referring to a periodic CSI report and/or an aperiodic CSI report and notifies a W2 precoder indicator and scheduled rank to the UE through PDCCH.

Figure 10:
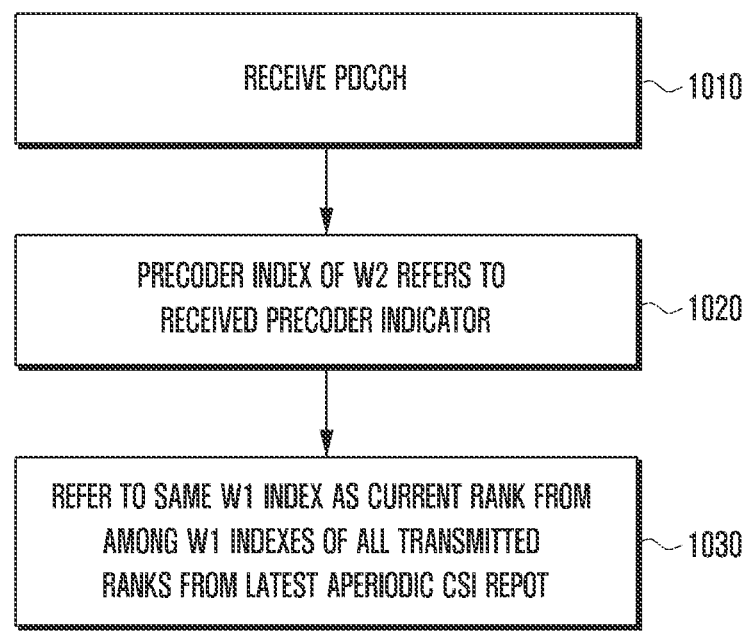
FIG. 10 is a flow diagram illustrating a process of receiving precoding-related information at UE according to the fourth embodiment of this description.

FIG. 10 is a flow diagram illustrating a process of receiving precoding-related information at UE according to the fourth embodiment of this description.

Referring to FIG. 10, at step 1010, the UE receives PDCCH. The UE obtains an index of a precoder indicated by a precoder indicator and rank scheduled by the base station from control information transmitted through PDCCH. At step 1020, the UE finds a W2 precoder by an index indicated by a precoder indicator. At step 1030, the UE obtains a W1 precoder index in rank 1, a W1 precoder index in rank 2, a W1 precoder index in rank 3, and a W1 precoder index in rank 4, transmitted through the latest aperiodic CSI report, and then obtains a W1 precoder corresponding to rank scheduled by the base station. Using the obtained W1 precoder and W2 precoder, the UE obtains a precoder used for PDSCH precoding.

A modification of the third embodiment may be applied to the fourth embodiment. Namely, an aperiodic CSI report may contain only the first W1 precoder index applied in common to RI 1 and RI 2 and the second W1 precoder index applied in common to RI 3 and RI 4 rather than containing a W1 precoder index for each rank. According to such a modification, the size of an aperiodic CSI report is reduced in comparison with the fourth embodiment.

The UE receives a signal by applying a precoder according to the obtained precoder indicator.

The fifth embodiment of this description relates to a method of allowing the UE to find a precoder used for precoding of PDSCH through confirmation instructions transmitted by the base station.

According to the fifth embodiment, depending on whether precoding confirmation is applied, the UE determines precoding assumed to be applied to PDSCH. In the above, confirmation is a control signal through which the base station instructs the UE whether to use an indicator of a precoder contained in the latest aperiodic CSI report. In LTE, using one bit, the base station notifies the UE whether such confirmation is applied. Therefore, through a confirmation indicator, the base station may indicate a precoder of other codebook and also indicate a precoder of a great sized codebook that cannot be indicated to the UE through a precoder indicator. For example, the UE may assume the first codebook (having a size of 16 or less) when a value of bit notifying the confirmation is '0', and assume the second codebook (having a size of 17 or more) when a value of bit notifying the confirmation is '1'.

In applying this embodiment to other technique, this invention is applied to any operation that performs the same function even though the term confirmation is not used explicitly. The base station may notify, through precoder confirmation, the UE to apply precoding reported with an aperiodic CSI or may notify, using a precoder indicator, which precoding will be used specifically. This invention is characterized in that a codebook assumed by the UE when precoder confirmation of the base station is applied may be different from a codebook assumed by the UE when the base station notifies it by using a precoder indicator. In this embodiment, a codebook indicated to the UE through a precoder indicator by the base station is referred to as the first codebook, and a codebook indicated through a confirmation signal is referred to as the second codebook. The first codebook may be a subset of the second codebook. Also, the first codebook and the second codebook may be different from each other.

In case the amount of precoding-related information capable of being notified to the base station through CSI by the UE is greater than the amount of precoding-related information capable of being indicated to the UE by the base station in transmission of PDSCH, a method proposed in the fifth embodiment may be used helpfully. Namely, related overhead of downlink is minimized by limitedly applying a codebook, offering more precise precoding but requiring relatively much more information for notification to the UE, to only case when a precoding confirmation function is applied.

Figure 11:
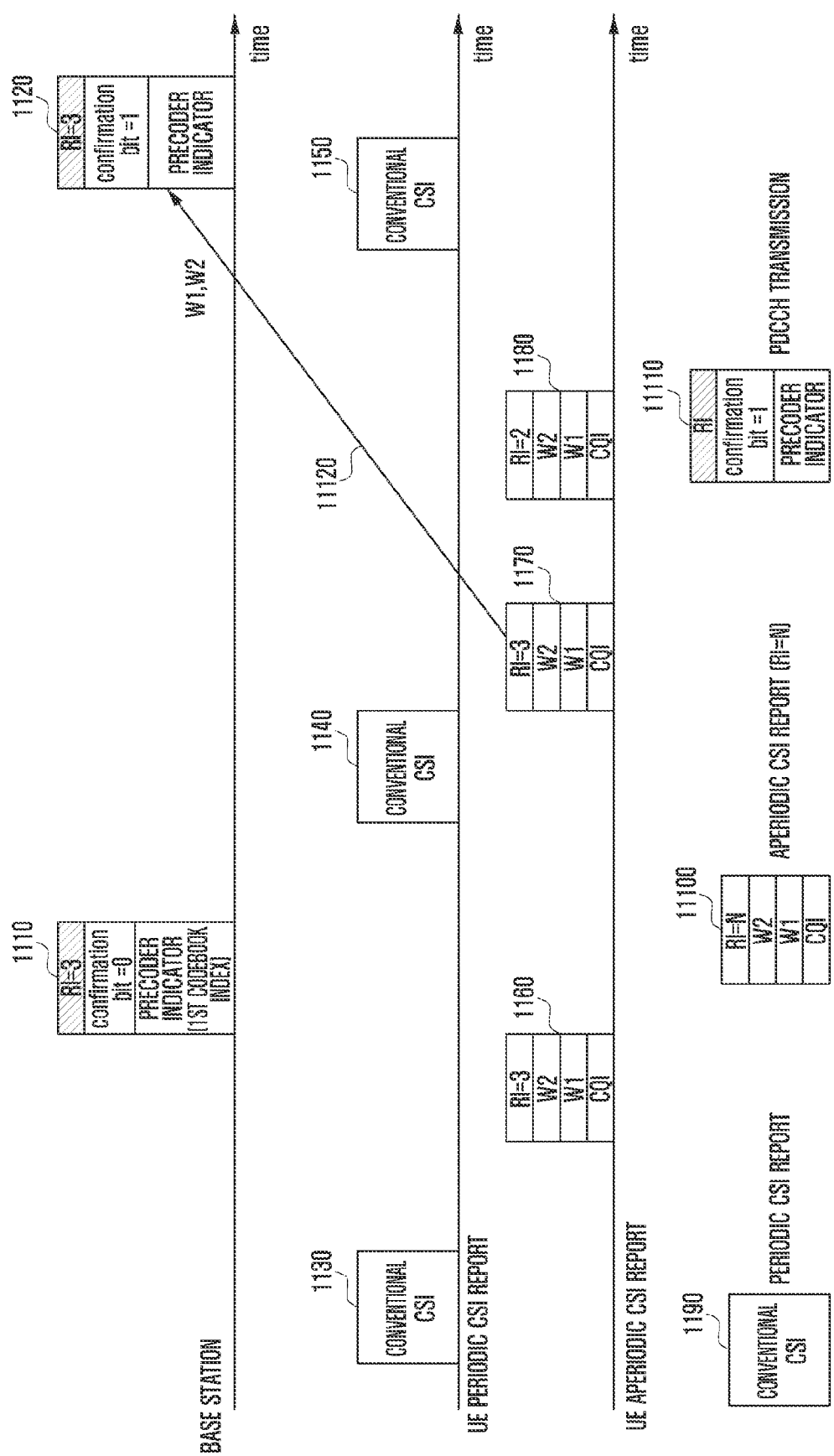
FIG. 11 illustrates a transmission/reception procedure of precoder-related information according to the fifth embodiment of this description.

FIG. 11 illustrates a transmission/reception procedure of precoder-related information according to the fifth embodiment of this description.

Referring to FIG. 11, at steps 1130, 1140 and 1150, the UE transmits a precoder index of the first codebook through a periodic CSI report on PUCCH. The first codebook may be, for example, a conventional codebook (size 16). Meanwhile, at steps 1160, 1170 and 1180, the UE transmits an aperiodic CSI report through PUSCH at the request of the base station, and transmitted information contains a precoder index (W1 and W2, or one precoder index corresponding to the second codebook) based on the second codebook. If the first codebook is used for precoding of PDSCH, the base station sets a confirmation bit to 0, inserts a precoder index to be used for precoding in a precoder indicator, and transmits it through PDCCH at step 1110. If the second codebook is used for precoding of PDSCH, the base station sets a confirmation bit to 1 and transmits it through PDCCH at step 1120.

Figure 12:
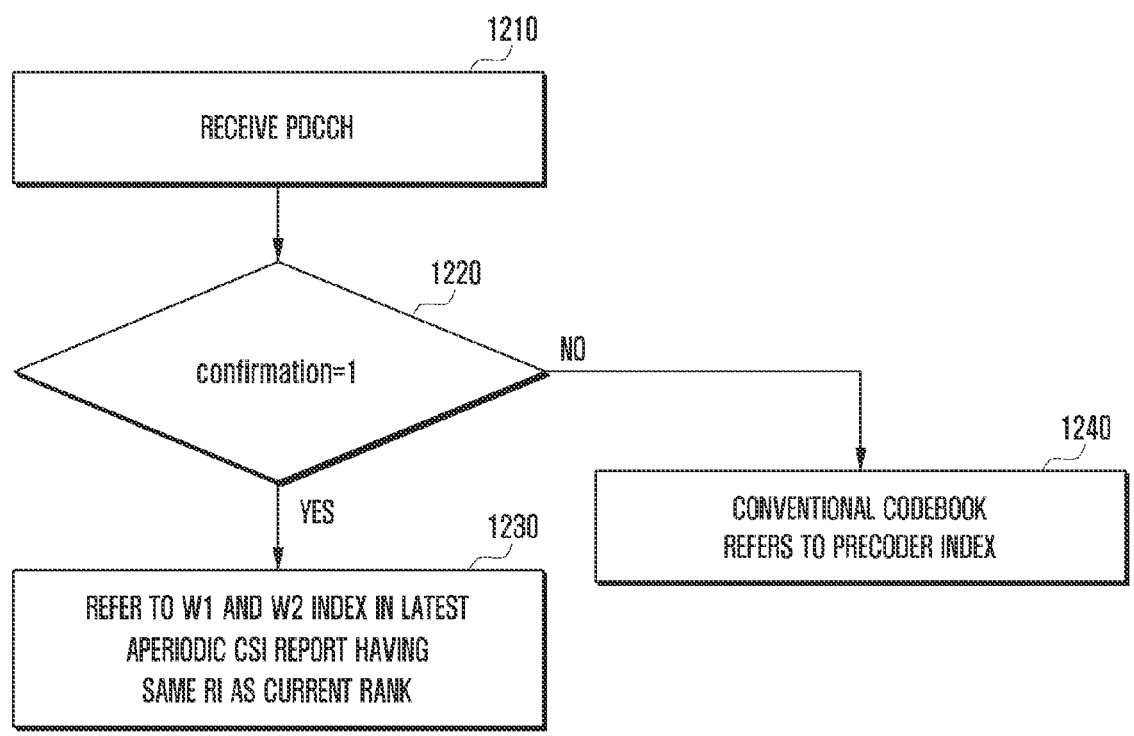
FIG. 12 is a flow diagram illustrating a process of receiving precoder-related information at UE according to the fifth embodiment of this description.

FIG. 12 is a flow diagram illustrating a process of receiving precoder-related information at UE according to the fifth embodiment of this description.

Referring to FIG. 12, at step 1210, the UE receives, through PDCCH, control information about a precoder applied to PDSCH transmission by the base station. The received control information includes information associated with precoding and rank scheduled to the UE by the base station. At step 1220, the UE identifies a value of confirmation bit contained in the control information. If the confirmation bit is set to 1, step 1230 is performed. At step 1230, the UE determines that the second codebook is used for precoding, and obtains a precoder index regarding the second codebook transmitted through the latest aperiodic CSI report. Here, the UE may obtain a precoder index of W1 and a precoder index of W2 according to one of the second embodiment to the fourth embodiment.

On the contrary, if the confirmation bit is set to 0 at step 1220, the UE determines that the base station performs precoding by using the first codebook in transmission of PDSCH, and refers to a precoder index regarding the first codebook indicated by a precoder indicator.

The UE receives a signal by applying a precoder according to the obtained precoder indicator.

Figure 13A:
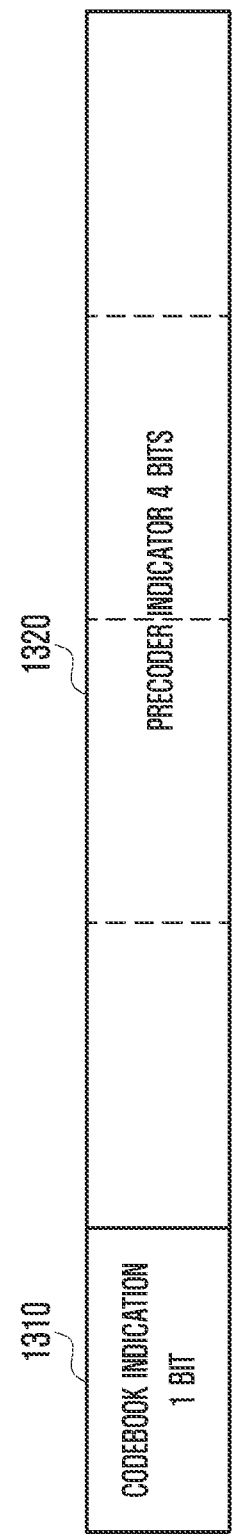
FIG. 13A is a diagram illustrating a field structure of precoder-related information according to the sixth embodiment of this description.

FIG. 13A is a diagram illustrating a field structure of precoder-related information according to the sixth embodiment of this description.

Figure 13B:
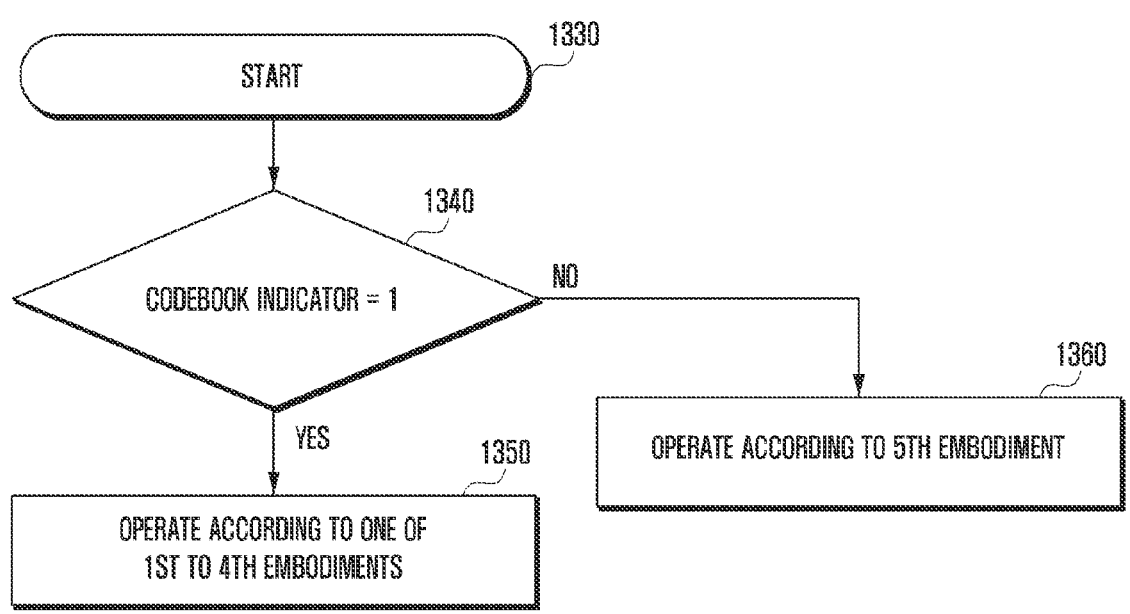
FIG. 13B is a flow diagram illustrating a process of receiving precoder-related information at UE according to the sixth embodiment of this description.

FIG. 13B is a flow diagram illustrating a process of receiving precoder-related information at UE according to the sixth embodiment of this description.

This embodiment will be described with an example of the first codebook and the second codebook having a W1 and W2 double codebook structure.

Referring to FIGS. 13A and 13B, one bit 1310 may be added to a conventional precoder indicator 1320. This added bit 1310 is referred to as a codebook indication bit. Using the codebook indication bit 1310, the base station notifies, through PDCCH, the UE whether precoding of PDSCH uses the second codebook only or both the first codebook and the second codebook. A codebook indicator 1320 is not always transmitted together with a precoder indicator and may be transmitted separately. The codebook indicator may be transmitted, for example, through PDCCH and/or RRC.

A process is stated at step 1330. At step 1340, the UE determines whether a codebook indicator is 1, for example. Let's suppose that the second codebook only is used when the codebook indicator is 1, and both the first codebook and the second codebook are used when the codebook indicator is 0. In case the codebook indicator is 1, step 1350 is performed. In the other case, step 1360 is performed. At step 1350, the UE may operate according to one of the first embodiment to the fourth embodiment. At step 1360, the UE operate according to the fifth embodiment. In case of intending to use the second codebook only for the UE, the base station may set the codebook indicator to 1 and transmit it to the UE. Otherwise, in case of intending to use both the first codebook and the second codebook for the UE, the base station may set the codebook indicator to 0 and transmit it to the UE. Subsequent operations of the base station correspond to embodiments regarding operations of the UE.

Although an index of W1 refers to an aperiodic CSI report and W2 uses an index indicated by a precoder indicator in finding a precoder index in some of the above-discussed embodiments, the opposite way may be utilized according to a modified example.

Figure 14:
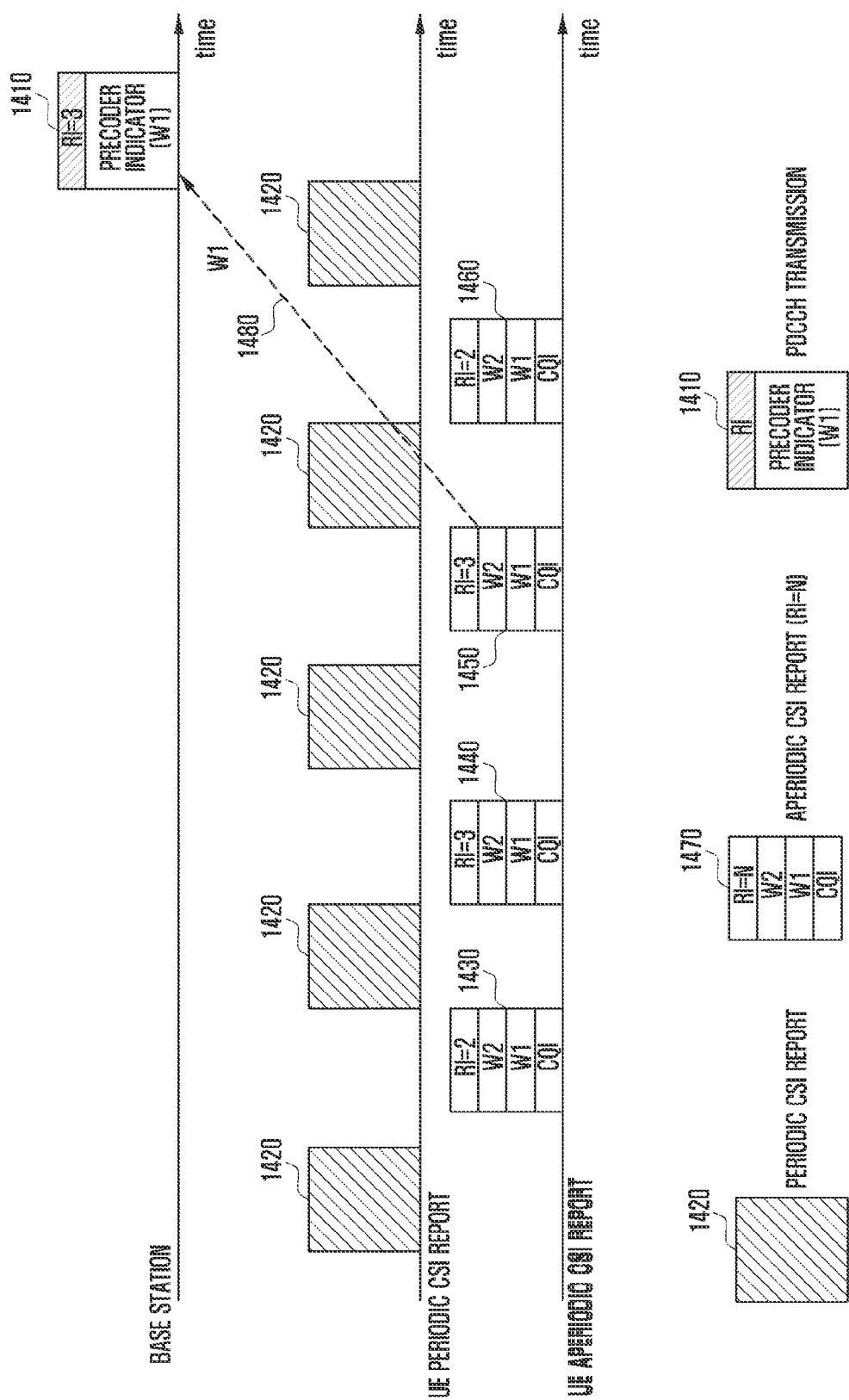
FIG. 14 illustrates a transmission/reception procedure of precoding-related information according to a modified example of the second embodiment of this description.

FIG. 14 illustrates a transmission/reception procedure of precoding-related information according to a modified example of the second embodiment of this description.

Referring to FIG. 14, periodic CSI report steps 1420, aperiodic CSI report steps 1430, 1440, 1450 and 1460, and precoder-related information transmission step 1410 are disclosed. While this modified example shown in FIG. 14 is similar to the second embodiment, there are differences in that the base station transmits explicitly a W1 precoder through a control signal and further W2 utilizes a W2 precoder contained in the latest aperiodic CSI report from among aperiodic CSI reports corresponding to relevant rank (RI=3).

Figure 15:
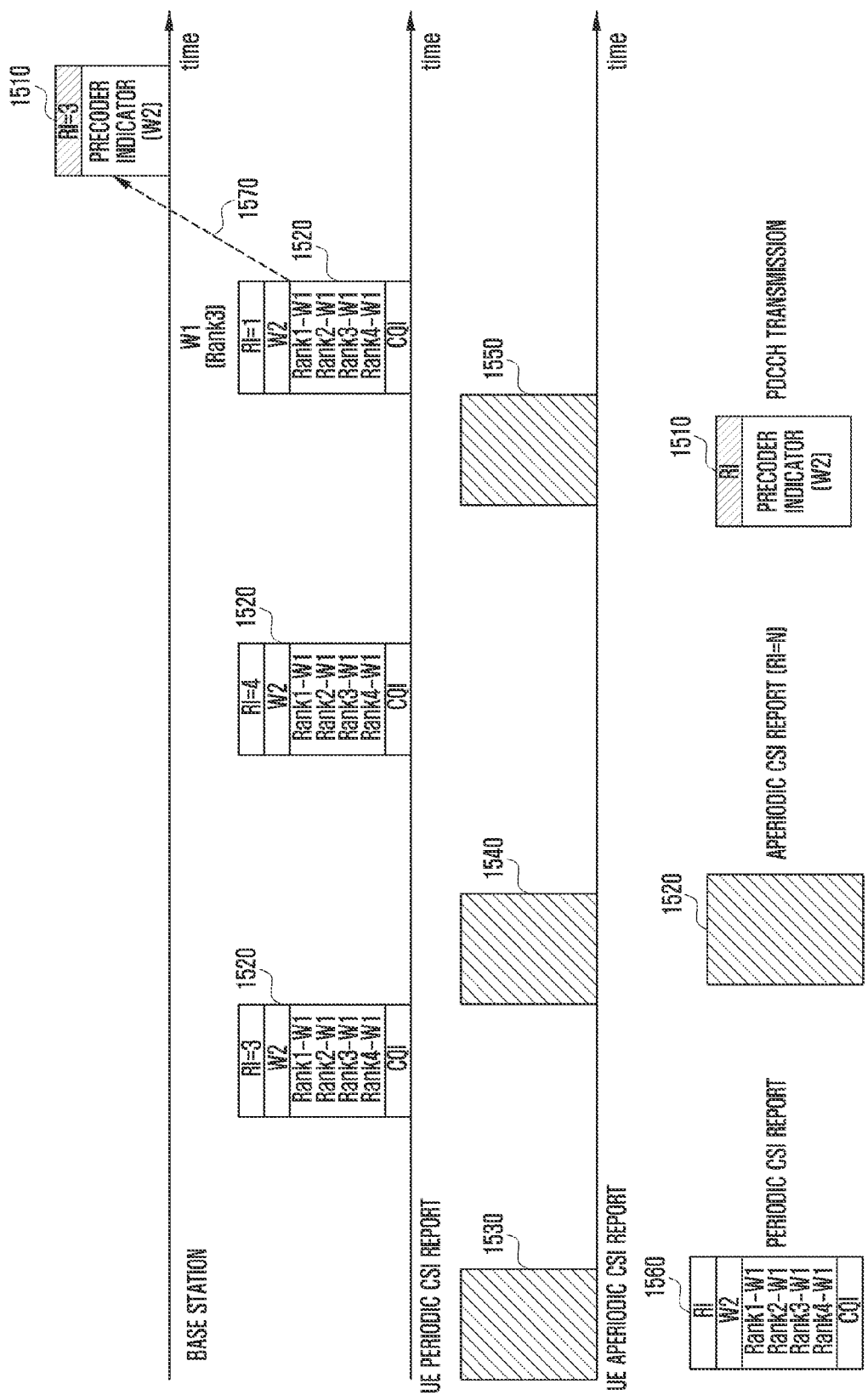
FIG. 15 illustrates a transmission/reception procedure of precoding-related information according to a modified example of the fourth embodiment of this description.

FIG. 15 illustrates a transmission/reception procedure of precoding-related information according to a modified example of the fourth embodiment of this description.

Referring to FIG. 15, the base station and the UE utilize a W1 precoder contained in the latest periodic CSI report having precoder information corresponding to rank of precoding-related information indication 1510 from among periodic CSI reports 1520 regardless of aperiodic CSI reports 1530, 1540 and 1550. Here, the periodic CSI reports 1520 may contain RI, a W2 precoder index, CQI, and a W1 precoder index of each rank.

Figure 16:
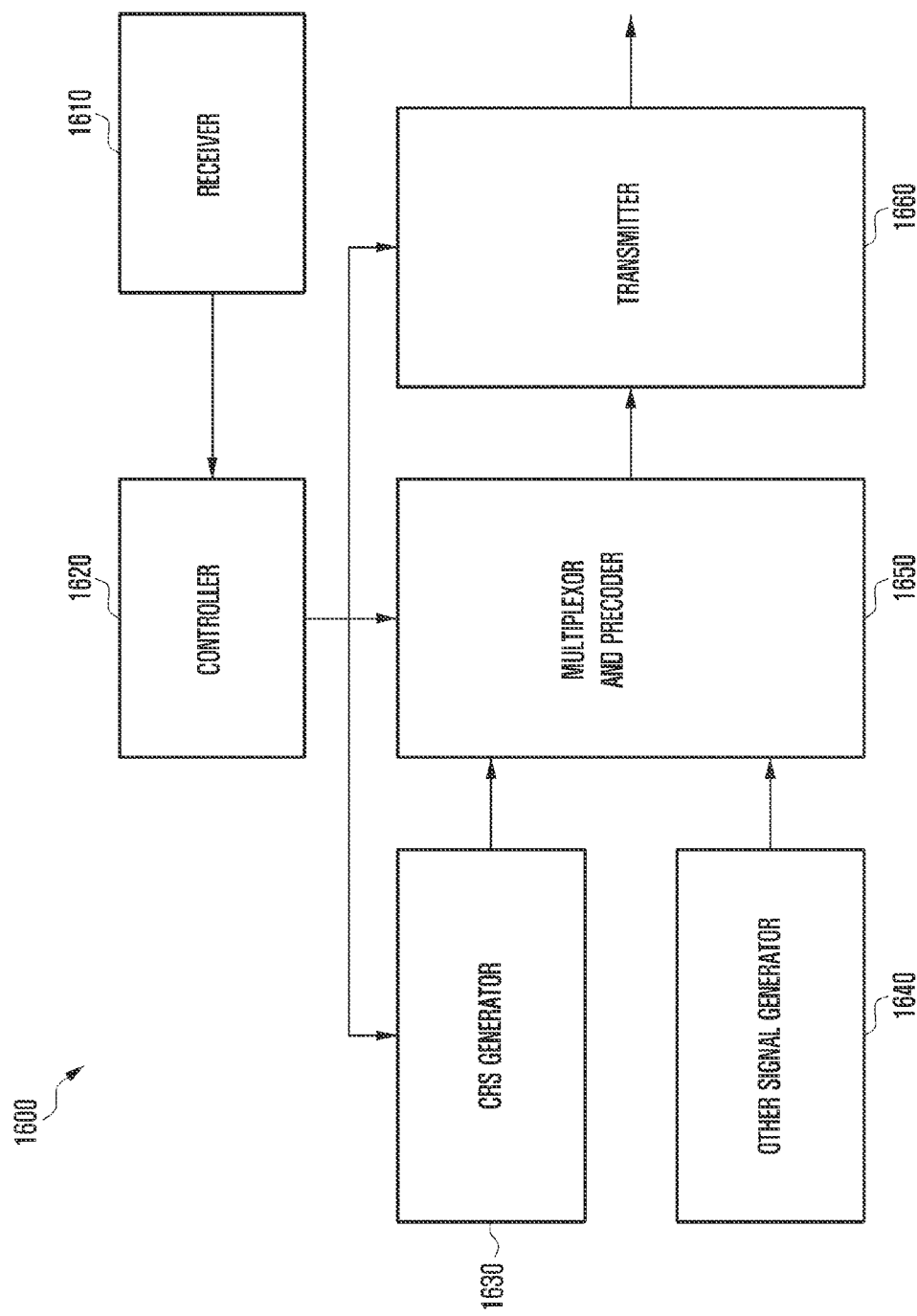
FIG. 16 is a block diagram of a base station according to an embodiment of this description.

FIG. 16 is a block diagram of a base station according to an embodiment of this description.

Referring to FIG. 16, the base station 1600 according to this invention may include a receiver 1610, a controller 1620, a CRS generator 1630, an other signal generator 1640, a multiplexor and precoder 1650, and a transmitter 1660. The receiver 1610 receives a periodic CSI report and an aperiodic CSI report from UE and delivers them to the controller 1620. The controller 1620 selects a precoder to be used for precoding in a codebook, based on CSI information, and delivers it to the multiplexor and precoder 1650 to perform precoding together with a signal received from the other signal generator 1640.

Specifically, the controller 1620 determines whether to use a W1 and W2 codebook, determines W2, delivers the determined W2 to the multiplexor and precoder 1650, and records index information of W2 in an information region of a precoder indicator. W1 indicates, to the multiplexor and precoder 1650, a precoder indicated by an index of W1 contained in an aperiodic CSI report received through the receiver 1610. The multiplexor and precoder 1650 precodes a signal received from the other signal generator 1640, multiplexes a signal received from the CRS generator 1630, and transmits them to the UE through the transmitter 1660.

Each element of the base station may operate so that the base station operates according to one or more of the above-discussed embodiments.

Figure 17:
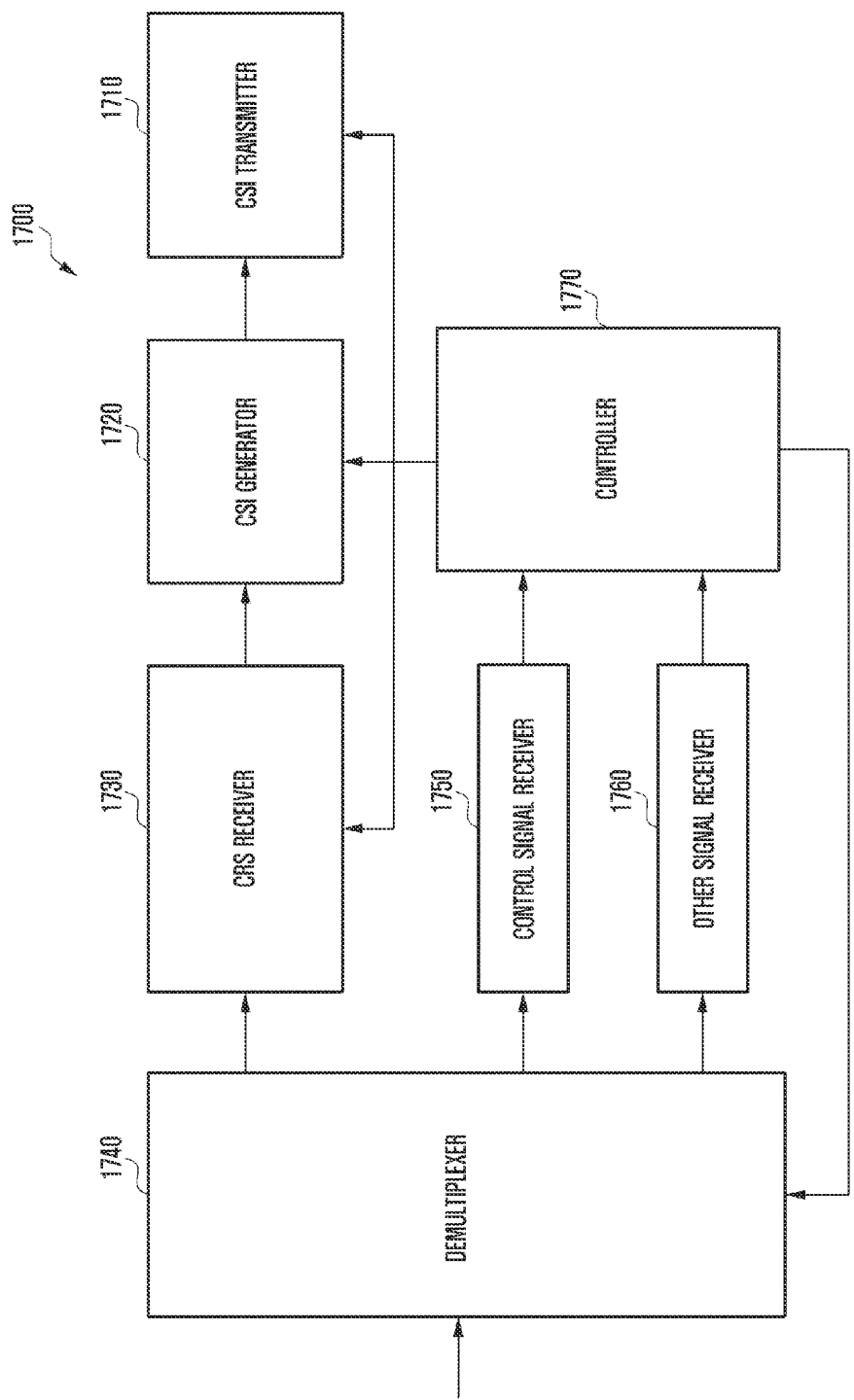
FIG. 17 is a block diagram of UE according to an embodiment of this description.

FIG. 17 is a block diagram of UE according to an embodiment of this description.

Referring to FIG. 17, the UE 1700 according to this invention may include a CSI transmitter 1710, a CSI generator 1720, a CRS receiver 1730, a demultiplexer 1740, a control signal receiver 1750, an other signal receiver 1760, and a controller 1770. The controller 1770 inputs a radio signal received from a base station into the demultiplexer 1740. The demultiplexer 1740 separates a CRS signal, a control signal, and the other signal from the received signal. The received CRS signal is delivered to the CSI generator 1720 through the CRS receiver 1730. The CSI generator 1720 creates CSI to be transmitted to the base station, based on feedback-related information notified by the base station, and transmits it to the base station through the CSI transmitter 1710. A precoder indicator and the content of confirmation in a control signal received from the demultiplexer 1740 are delivered to the controller 1770 through the control signal receiver 1750 and/or the other signal receiver 1760. The controller 1770 may obtain a precoder index and perform decoding, based on the content received from the control signal receiver 1750.

Each element of the UE may operate so that the UE operates according to one or more of the above-discussed embodiments.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention. Accordingly, it should be apparent to those skilled in the art that this description is provided for illustration purpose only and not for the purpose of limiting the present invention as defined by the appended claims and their equivalents.

INDUSTRIAL APPLICABILITY

While this invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method by a user equipment (UE) in a wireless communication network, the method comprising steps of:
   receiving a rank indicator (RI) and a first precoder indicator from a base station;
   obtaining a second precoder indicator corresponding to the received RI, from at least one aperiodic channel state information (CSI) report or periodic CSI report which was previously transmitted by the UE; and
   receiving a signal using the received first precoder indicator and the obtained second precoder indicator.

2. The method of claim 1, wherein the step of obtaining the second precoder indicator includes obtaining the second precoder indicator contained in the latest aperiodic CSI report corresponding to the RI from among the at least one aperiodic CSI report.

3. The method of claim 1, wherein the step of obtaining the second precoder indicator includes obtaining the second precoder indicator contained in the latest aperiodic CSI report from among aperiodic CSI reports corresponding to the RI of the at least one aperiodic CSI report or the RI set to use the same precoder as the RI.

4. The method of claim 1, wherein the aperiodic CSI report contains the second precoder indicator for each of a plurality of RIs, or the periodic CSI report contains the second precoder indicator for each of a plurality of RIs.

5. The method of claim 4, wherein the step of obtaining the second precoder indicator includes obtaining the second precoder indicator for the RI from among the second precoder indicators contained in the latest aperiodic CSI report from among the at least one aperiodic CSI report.

6. The method of claim 1, wherein the aperiodic CSI report contains the second precoder indicator for each of a plurality of RI groups having at least one RI, and wherein the same precoder is set to be used for RIs contained in the RI group.

7. The method of claim 6, wherein the step of obtaining the second precoder indicator includes obtaining the second precoder indicator for the RI group containing the RI from among the second precoder indicators contained in the latest CSI report from among the at least one aperiodic CSI report.

8. The method of claim 1, wherein the step of receiving the RI and the first precoder indicator includes receiving confirmation information indicating a codebook to be used between first and second codebooks, and wherein the second codebook is greater in size than the first codebook.

9. The method of claim 8, wherein the second precoder indicator is obtained in case the confirmation information indicates use of the second codebook.

10. The method of claim 1, wherein the first precoder indicator is associated with one of a W1 precoder index and a W2 precoder index having a double codebook structure, and the second precoder indicator is associated with the other.

11. A user equipment (UE)in a wireless communication network, comprising:
   a receiver configured to receive a rank indicator (RI) and a first precoder indicator from a base station; and
   a controller configured to:
      obtain a second precoder indicator corresponding to the received RI, from at least one aperiodic channel state information (CSI) report or periodic CSI report which was previously transmitted by the UE, and
      control the receiver to receive a signal using the received first precoder indicator and the obtained second precoder indicator.

12. The UE of claim 11, wherein the controller is further configured to obtain the second precoder indicator contained in the latest aperiodic CSI report corresponding to the RI from among the at least one aperiodic CSI report.

13. The UE of claim 11, wherein the receiver is further configured to receive confirmation information indicating a codebook to be used between first and second codebooks, and wherein the second codebook is greater in size than the first codebook.

14. The UE of claim 11, wherein the first precoder indicator is associated with one of a W1 precoder index and a W2 precoder index having a double codebook structure, and the second precoder indicator is associated with the other.

15. A method by a base station in a wireless communication network, the method comprising steps of:
   receiving an aperiodic channel state information (CSI) report from a user equipment (UE);
   transmitting a rank indicator (RI) and a first precoder indicator to the UE;
   obtaining a second precoder indicator corresponding to the RI, from at least one aperiodic CSI report or periodic CSI report which was previously transmitted by the UE; and
   transmitting a signal to the UE using the first precoder indicator and the obtained second precoder indicator.

16. A base station in a wireless communication network, comprising:
   a receiver configured to receive an aperiodic channel state information (CSI) report from a user equipment (UE);
   a transmitter configured to transmit a rank indicator (RI) and a first precoder indicator to the UE; and
   a controller configured to:
      obtain a second precoder indicator corresponding to the RI, from at least one aperiodic CSI report or periodic CSI report which was previously transmitted by the UE, and
      control the transmitter to transmit a signal to the UE by using the first precoder indicator and the obtained second precoder indicator.

* * * * *